(12) United States Patent
Ono et al.

(10) Patent No.: US 9,011,041 B2
(45) Date of Patent: Apr. 21, 2015

(54) SUBIRRIGATION SYSTEM

(75) Inventors: Naoki Ono, Osaka (JP); Hiroaki Sakamoto, Osaka (JP); Kazuhiro Hirao, Osaka (JP); Toshinobu Kakita, Osaka (JP); Yasushi Wada, Osaka (JP); Yoshihito Fujii, Tokyo (JP); Tsuneo Onodera, Miyagi (JP)

(73) Assignees: Kubota-C.I. Co., Ltd., Sakai-shi (JP); Paddy Research Co., Ltd., Tome-shi (JP)

( * ) Notice: Subject to any disclaimer, the term of this patent is extended or adjusted under 35 U.S.C. 154(b) by 479 days.

(21) Appl. No.: 12/675,531

(22) PCT Filed: Aug. 25, 2008

(86) PCT No.: PCT/JP2008/065623
§ 371 (c)(1),
(2), (4) Date: Aug. 12, 2010

(87) PCT Pub. No.: WO2009/028702
PCT Pub. Date: Mar. 5, 2009

(65) Prior Publication Data
US 2010/0296870 A1 Nov. 25, 2010

(30) Foreign Application Priority Data

Aug. 27, 2007 (JP) ................................ 2007-219301
Feb. 1, 2008 (JP) ................................ 2008-022455
Jul. 25, 2008 (JP) ................................ 2008-192399

(51) Int. Cl.
*E02B 11/00* (2006.01)
*A01G 25/06* (2006.01)

(52) U.S. Cl.
CPC ...................................... *A01G 25/06* (2013.01)

(58) Field of Classification Search
USPC .................. 405/36–41, 50, 51; 47/21.1, 48.5
See application file for complete search history.

(56) References Cited

U.S. PATENT DOCUMENTS 3,057,116 A * 10/1962 Szochet ..................... 47/58.1 R
3,183,674 A * 5/1965 Boschen ......................... 405/37
(Continued)

FOREIGN PATENT DOCUMENTS

JP 42-11255 6/1967
JP 55-77831 A 6/1980
(Continued)

OTHER PUBLICATIONS

Japanese Office Action dated May 13, 2014, issued in Japanese Patent Application No. 2013-082022 (4 pages).
(Continued)

*Primary Examiner* — Doug Hutton, Jr.
*Assistant Examiner* — Patrick Lambe
(74) *Attorney, Agent, or Firm* — Westerman, Hattori, Daniels & Adrian, LLP

(57) ABSTRACT

A subirrigation system 10 includes a water-impervious member 16, and keeps water content in soil of a cultivated land 200 in a proper state for growing a plant. The water-impervious member 16 is formed into an upper opening vessel shape, and has a water reserving function. Water is fed to an inner portion of the water-impervious member 16 from a water tank 12 via a feed water pipe 14, whereby a soil portion 26 in a gravitational water state is formed. A water level 28 of the gravitational water within the water-impervious member 16 is properly controlled to a desired water level by a water level controller 18 provided in the feed water pipe 14. The gravitational water within the water-impervious member 16 controlled to the desired water level is appropriately sucked up to the soil in an upper layer in accordance with a capillary phenomenon. Accordingly, a soil portion 30 in a capillary water state having proper water content is formed in the cultivated land 200.

13 Claims, 32 Drawing Sheets

(56) References Cited

U.S. PATENT DOCUMENTS

| | | | |
|---|---|---|---|
| 3,408,818 A * | 11/1968 | Hemphill | 405/37 |
| 3,479,825 A * | 11/1969 | Hellstrom | 405/38 |
| 4,060,991 A * | 12/1977 | Reese | 405/36 |
| 4,180,348 A | 12/1979 | Taylor | |
| 4,188,154 A * | 2/1980 | Izatt | 405/43 |
| 4,431,338 A * | 2/1984 | Hornabrook | 405/37 |
| 4,464,079 A * | 8/1984 | Chance | 405/37 |
| 4,497,333 A * | 2/1985 | Rodieck | 137/122 |
| 4,696,739 A * | 9/1987 | Pedneault | 210/121 |
| 4,771,572 A * | 9/1988 | Higa | 47/58.1 R |
| 4,832,526 A * | 5/1989 | Funkhouser, Jr. | 405/43 |
| 4,920,694 A * | 5/1990 | Higa | 47/58.1 R |
| 5,074,708 A * | 12/1991 | McCann, Sr. | 405/38 |
| 5,350,251 A * | 9/1994 | Daniel | 405/37 |
| 5,374,138 A * | 12/1994 | Byles | 405/38 |
| 5,465,434 A * | 11/1995 | Coe | 4/546 |
| 5,584,602 A * | 12/1996 | Bevil | 405/36 |
| 5,590,980 A * | 1/1997 | Daniel | 405/37 |
| RE35,857 E * | 7/1998 | Mehoudar | 405/36 |
| 5,944,444 A * | 8/1999 | Motz et al. | 405/37 |
| 6,062,767 A * | 5/2000 | Kizhnerman et al. | 405/39 |
| 6,132,139 A * | 10/2000 | Hashimoto et al. | 405/104 |
| 6,308,348 B1 * | 10/2001 | Liou | 4/388 |
| 6,428,239 B1 * | 8/2002 | Davis | 405/43 |
| 6,464,865 B2 * | 10/2002 | Tipton et al. | 210/170.08 |
| 7,487,925 B2 * | 2/2009 | Skinner | 239/63 |
| 7,985,035 B2 * | 7/2011 | Moody | 405/96 |
| 8,043,026 B2 * | 10/2011 | Moody | 405/96 |
| 2002/0096654 A1 * | 7/2002 | Holloway, Jr. | 251/129.11 |
| 2004/0005193 A1 * | 1/2004 | Mazzei | 405/43 |
| 2005/0025573 A1 * | 2/2005 | Waldman et al. | 405/41 |
| 2006/0127183 A1 * | 6/2006 | Bishop, Jr. | 405/37 |

FOREIGN PATENT DOCUMENTS

| | | |
|---|---|---|
| JP | 59-175830 A | 10/1984 |
| JP | 62-151121 A | 7/1987 |
| JP | 63-36715 | 2/1988 |
| JP | 03-206823 A | 9/1991 |
| JP | 08-302800 A | 11/1996 |
| JP | 10-150867 A | 6/1998 |
| JP | 2002-272275 A | 9/2002 |
| WO | 01-00009 A1 | 1/2001 |

OTHER PUBLICATIONS

Japanese Office Action dated Jan. 16, 2013, issued in corresponding Japanese Patent Application No. 2008-022455 (4 pages).

* cited by examiner

SUBIRRIGATION SYSTEM

CLAIM OF PRIORITY

This application is a U.S. national phase application under 35 U.S.C. §371 of International Patent Application No. PCT/JP2008/065623 filed Aug. 25, 2008, which claims the benefit of Japanese Patent Application No. 2007-219301 filed Aug. 27, 2007, Japanese Patent Application No. 2008-022455 filed Feb. 1, 2008 and Japanese Patent Application No. 2008-192399 filed Jul. 25, 2008, the disclosures of which are hereby incorporated by reference in their entireties. The International Application was published in Japanese on Mar. 5, 2009 as WO 2009/028702.

TECHNICAL FIELD

This invention relates to a subirrigation system, and more particularly to a subirrigation system, for example, feeding water from underground so as to properly keep water content of soil.

PRIOR ART

An example of a plant growing apparatus used at a time of growing various plants in a home is disclosed, for example, in Japanese Patent Application Laying-Open No. 2002-272275 (Patent Document 1) laid-open on Sep. 24, 2002. Specifically, in the technique of Patent Document 1, a cultivation vessel accommodating vegetation soil is provided in an upper portion within a water tank storing water for cultivation, and a water-absorbing material being dipped into the water for cultivation within the water tank is suspended from a lower portion of the cultivation vessel. The water for cultivation is sucked up in accordance with a capillary phenomenon of the water-absorbing material, and is fed to the vegetation soil.

Further, one example of a water storage type soil system having a water level regulating function is disclosed, for example, in Japanese Patent Application Laying-Open No. 8-302800 (Patent Document 2) laid-open on Nov. 19, 1996. Specifically, in the technique of Patent Document 2, a turf paved zone or the like is formed as a water storage type by a seepage control sheet, and the water due to rainfall or a water spray is collected without being permeated underground by a culvert pipe laid on the seepage control sheet. Further, the water content of the soil is regulated by purpose by introducing the collected water to a water level regulating leader head having a water level regulating function per block, and regulating the underground water level.

However, in the technique of Patent Document 1, since impurities in the water for cultivation adhere to a surface of the water-absorbing material, and clogging of the water-absorbing material is generated, a permeating function of the water-absorbing material is largely lowered in accordance with a passage of time. Accordingly, in the technique of Patent Document 1, since the necessity for cleaning and exchanging the water-absorbing material arises, operation and maintenance take a lot of trouble. Further, the technique of Patent Document 1 is a technique applied to small-scale structure such as a planter for cultivating flowering grasses in the home, and cannot be applied practically to a large-scale upland cropping or the like.

Further, since the water is collected by using the culvert pipe in the technique of Patent Document 2, soil particles or the like tend to be accumulated in holes of the culvert pipe, and the clogging tends to be generated. If the clogging is generated in the hole of the underground pipe, the water collecting function is largely lowered. Accordingly, in the technique of Patent Document 2, it is necessary to clean the culvert pipe periodically, and the operation and maintenance take a lot of trouble. In this case, a filter material for the culvert pipe is charged around the culvert pipe, however, since any specific structure thereof is not described, an effect thereof is unknown. For example, if broken stones, ballasts or the like are used as the filter material for the culvert pipe, the soil particles pass through gaps therebetween and the hole of the culvert pipe is clogged. Further, if the filter material for the culvert pipe formed by a fiber or the like and having a fine texture is used, the filter material itself for the culvert pipe may be clogged.

Further, in the technique of Patent Document 2, the water is fed to the soil with the natural rainfall or the water spray, and the underground water level is regulated in a water discharge side by the water level regulating leader head. In a region that the natural rainfall tends to fall short or the like, the water is fed to the soil in accordance with the water spray, however, since it is impossible to keep the underground water level to a target water level if the feed water to the soil falls short, the water tends to be fed excessively in the technique of Patent Document 2. The excessively fed water is only discharged to a drain pipe, and a wasting of a water resource is generated.

SUMMARY OF THE INVENTION

Accordingly, a primary object of this invention is to provide a novel subirrigation system.

Another object of this invention is to provide a subirrigation system easily maintained and controlled.

Still another object of this invention is to provide a subirrigation system that can efficiently utilize a water resource.

This invention employs the following structures for solving the problem mentioned above. In this case, reference symbols, supplementary explanation and the like in parenthesis indicate correspondence relationships with an embodiment mentioned below for assisting an understanding of this invention, and do not limit this invention in any way.

A first aspect of the invention is a subirrigation system comprising a water-impervious member having soil in an upper side thereof; a water feeder which feeds water to the upper side of the water-impervious member to form a soil portion in a gravitational water state; and a water level controller which stops the feed water by the water feeder at a time when the water level of the gravitational water in the soil portion is equal to or more than a set water level, and carries out the feed water by the water feeder at a time when the water level of the gravitational water in the soil portion is less than the set water level.

In the first aspect of the invention, a subirrigation system (10) is provided with a water-impervious member (16), is applied to a cultivated land (200) or the like, and keeps water content of soil in a proper state for growing plants. A water feeder (12, 14) feeds the water to an upper side of the water-impervious member. This water permeates into the soil, and comes to gravitational water so as to form a soil portion (26) in a gravitational water state. Further, a water level controller (18) keeps a water level (28) of the gravitational water in the soil portion in the gravitational water state to a desired water level, by controlling the feed water by the water feeder. The gravitational water in the soil portion in the gravitational water state is sucked up to the soil above the same by a capillary phenomenon. Since the water content of the above soil fluctuates depending on a magnitude of the water level of the gravitational water, a soil portion (30) in a capillary water state having the proper water content is formed in the cultivated land or the like.

In accordance with the first aspect of the invention, since a permeating function of the soil itself is utilized, the reduction of the permeating function due to the clogging is not generated, and the operation and maintenance can be easily achieved. Further, since the water level control of the gravitational water is carried out in the feed water side, it is possible to efficiently utilize the water resource without feeding any waste water.

A second aspect of the invention is the subirrigation system dependent on the first aspect of the invention, and the water-impervious member is formed into an upper opening vessel shape, and the soil portion is formed in an inner portion thereof.

In the second aspect of the invention, the water-impervious member (16) is formed into an upper opening vessel shape, and has a water storage function. If the water is fed by the water feeder (12, 14), the water permeates into the soil within the water-impervious member, and comes to gravitational water so as to stay within the water-impervious member. Accordingly, the soil portion (26) in a gravitational water state is formed in an inner portion of the water-impervious member. Accordingly, it is possible to form the soil portion (30) in the capillary water state having the proper water content in the cultivated land (200) or the like, by keeping the water level (28) of the gravitational water to a proper position by using the water level controller (18).

A third aspect of the invention is the subirrigation system dependent on the second aspect of the invention, and the water feeder includes a feed water member which forms a water channel passing through an inner side of the water-impervious member.

In the third aspect of the invention, the water feeder (12, 14) includes a feed water member (90, 94, 100, 138). The feed water member forms a water channel (92) passing within the water-impervious member (16), and the water flowing through the water channel is fed to the soil within the water-impervious member via a plurality of fine holes, for example, formed in the feed water member so as to form the soil portion (26) in the gravitational water state. For example, in a case of using a water-impervious member formed long sideways, the feed water member forms a water channel over an entire length of the inner portion. Further, for example, in a case of connecting a plurality of water-impervious members in series, the feed water member forms a water channel passing through the inner portion of the water-impervious member and a feed water pipe (14, 22b).

In accordance with the third aspect of the invention, since it is possible to properly feed the water into the water-impervious member, it is possible to properly form the soil portion in the gravitational water state within the water-impervious member.

A fourth aspect of the invention is the subirrigation system dependent on the third aspect of the invention, and the water-impervious member is formed into a horizontal pipe shape having an opening in an upper surface thereof.

In the fourth aspect of the invention, the water-impervious member (16) is formed into a horizontal pipe shape, that is, a wide vessel shape, and an opening (98) is formed in an upper surface thereof. For example, such one opening as to run the full length of the water-impervious member can be formed, or a plurality of openings can be formed per predetermined distance.

A fifth aspect of the invention is the subirrigation system dependent on the fourth aspect of the invention, and the water-impervious member includes a rising portion rising upward from a peripheral edge of the opening.

In the fifth aspect of the invention, the water-impervious member (16) is provided with a rising portion (102) rising upward from a peripheral edge of the opening (98). Accordingly, the water-impervious member can secure its height while holding down its transverse width.

A sixth aspect of the invention is the subirrigation system dependent on the fourth or fifth aspect of the invention, and the water-impervious member includes a reinforcing portion which reinforces an edge of the opening.

In the sixth aspect of the invention, the water-impervious member (16) is provided with a reinforcing portion (112) which reinforces an edge of the opening (98). For example, a plurality of reinforcing portions are provided in an upper end portion of a pipe wall of the water-impervious member so as to be spaced at a predetermined distance in a pipe axial direction of the water-impervious member, whereby the water-impervious member can maintain its shape. Accordingly, it is possible to properly form the soil portion in the gravitational water state within the water-impervious member.

A seventh aspect of the invention is the subirrigation system dependent on any one of the fourth to sixth aspects of the invention, and the feed water member includes a pipe member provided in an inner portion of the water-impervious member.

In the seventh aspect of the invention, a pipe member (100, 138) is provided in an inner portion of the water-impervious member (16). The pipe member is provided as a feed water member in the inner portion of the water-impervious member formed into a horizontal pipe shape, and extends in a pipe axial direction of the water-impervious member. Accordingly, it is possible to properly permeate the water to an end portion within the water-impervious member formed into the horizontal pipe shape, making it possible to properly form the soil portion in the gravitational water state within the water-impervious member.

An eighth aspect of the invention is the subirrigation system dependent on the seventh aspect of the invention, and a connection member provided at least in one end portion of the water-impervious member is further provided, the connection member connects the water-impervious member and the other the water-impervious member, and connects the pipe member and the other the pipe member.

In the eighth aspect of the invention, a connection member (110) is provided in an end portion of the water-impervious member (16), and the water-impervious member and the other water-impervious member are connected by the connection member in such a manner as to extend to the vicinity of both ends of the cultivated land (200). The connection member is provided with a socket (114), receives the end portions of the water-impervious members by an outer tube portion (118) of the socket, and receives the end portion of the pipe member (100, 138) by an inner tube portion (120) of the socket.

In accordance with the eighth aspect of the invention, it is possible to extend to near both the ends of the cultivated land, in correspondence to a shape and a range of the cultivated land, even in the water-impervious member having a short length.

A ninth aspect of the invention is the subirrigation system dependent on the first aspect of the invention, and the water-impervious member is formed into a vertical pipe shape having an opening in an upper end thereof and a connection port in a side surface lower portion thereof, the water feeder is connected to the connection port; and the subirrigation system includes a water-permeable member provided in an upper portion than the connection port in the water-impervious member and provided for holding the soil portion into the water-impervious member.

In the ninth aspect of the invention, the water-impervious member (16) is formed into a vertical pipe shape, and an opening is formed in an upper end thereof. Further, a connection port (24) is formed in a lower portion of a side surface of the water-impervious member, and a water-permeable member (94) for keeping the soil in an upper side is provided in an upper portion than the connection port in the water-impervious member. The water feeder (12, 14) is connected to the connection port, and the water from the water feeder is fed to the soil within the water-impervious member via the water-permeable member. Accordingly, the soil portion (26) in the gravitational water state in the upper side of the water-permeable member is formed in the inner portion of the water-impervious member.

A tenth aspect of the invention is the subirrigation system dependent on any one of the second to ninth aspects of the invention, and the water-impervious member further includes a collar-shaped member having a water-impervious property.

In the tenth aspect of the invention, the water-impervious member (16) is provided with a collar-shaped member (96) formed by a member having a water-impervious property. The collar-shaped member is provided, for example, in such a manner as to extend in a collar shape from a side wall of the water-impervious member, and prevents the water of the soil portion (26) in the gravitational water state from permeating into the soil below an arranged position.

In accordance with the tenth aspect of the invention, it is possible to form the soil portion in the capillary water state more efficiently expanding to a wide range, by lowering an amount of the water permeating downward, making it possible to reduce the amount of the used water.

An eleventh aspect of the invention is the subirrigation system dependent on the first aspect of the invention, and the water-impervious member is formed into a sheet shape, and the soil portion is formed in an upper side thereof.

In the eleventh aspect of the invention, the water-impervious member (16) is formed into the sheet shape. Then, the soil portion (26) in the gravitational water state is formed in an upper side thereof by feeding water by means of the water feeder (12, 14).

A twelfth aspect of the invention is the subirrigation system dependent on any one of the second to tenth aspects of the invention, and a plurality of the water-impervious members are arranged in a dispersing manner in the ground, and the water feeder includes a feed water pipe feeding water to each of a plurality of the water-impervious members.

In the twelfth aspect of the invention, a plurality of water-impervious members (16) are arranged in a dispersing manner in the ground of the cultivated land (200). Further, the water feeder (12, 14) includes a feed water pipe (14), and the soil portion (26) in the gravitational water state is formed in the inner portion of each of the water-impervious members by feeding water to each of a plurality of water-impervious members while using the feed water pipe.

In accordance with the twelfth aspect of the invention, since the water-impervious members are arranged in the dispersing manner, it is sufficient to excavate only a laid-down portion at a time of laying down the water-impervious member, and it is possible to reduce a cost of an earthwork for excavating and back filling. Further, since the water excessively fed due to the rainfall or the like permeates into the underground due to a gravitational force through between the water-impervious members, equipment for discharging the redundant water is not necessary.

A thirteenth aspect of the invention is the subirrigation system dependent on the twelfth aspect of the invention, and the feed water pipe includes a main pipe, and a plurality of branch pipes extending to the water-impervious member while branching from the main pipe, and the water level controller controls the feed water from the main pipe to the branch pipes.

In the thirteenth aspect of the invention, the feed water pipe 14 includes a main pipe (20) and a plurality of branch pipes (22a, 22b). The branch pipes are branched from the main pipe so as to extend respectively to a plurality of water-impervious members (16), and the soil portion (26) in the gravitational water state is formed in the inner portion of each of the water-impervious members by feeding the water to each of the plurality of water-impervious members. Further, a water level controller (18) controls the feed water from the main pipe to the branch pipes. In other words, the water level controller keeps the water level of the gravitational water at a desired water level, by stopping the feed water from the main pipe to the branch pipes in a case that the water level (28) of the gravitational water is equal to or more than a set water level, and feeding the water from the main pipe to the branch pipes in a case that the water level of the gravitational water is less than the set water level. Accordingly, it is possible to collectively control the water level of the gravitational water within a plurality of water-impervious members.

A fourteenth aspect of the invention is the subirrigation system dependent on the twelfth aspect of the invention, and the feed water pipe includes a main pipe, and a plurality of branch pipes extending to the water-impervious member while branching from the main pipe, and the water level controller controls the feed water from the branch pipes to the water-impervious member.

In the fourteenth aspect of the invention, the feed water pipe (14) includes a main pipe (20) and a plurality of branch pipes (22a, 22b). The branch pipes are branched from the main pipe so as to extend respectively to a plurality of water-impervious members (16), and the soil portion (26) in the gravitational water state is formed in the inner portion of each of the water-impervious members by feeding the water to each of the plurality water-impervious members. Further, the water level controller (18) controls the feed water from the branch pipes to the water-impervious member. In other words, the water level controller individually controls the water level of the gravitational water for each water-impervious member or for each of a plurality of water-impervious members.

In accordance with the fourteenth aspect of the invention, since it is possible to individually regulate the water level of the gravitational water, the subirrigation system can be applied even to a slope land. Further, since it is possible to form the soil portions having different water content per place, in the applied cultivated land, it is possible to simultaneously cultivate the plants having the different water content that are suitable for growing within the same system.

A fifteenth aspect of the invention is a water level controller used in a subirrigation system according to any one of the first to fourteenth aspects of the invention, including a vertical pipe that water is fed from a feed water pipe to; and a float provided within the vertical pipe and working with a water level fluctuation within the vertical pipe, the water level controller closes the feed water port in accordance with a motion of the float, at a time when the water level within the vertical pipe is equal to or more than a set water level, and opens the feed water port at a time when the water level within the vertical pipe is less than the set water level.

In the fifteenth aspect of the invention, the water level controller (18) is applied to the subirrigation system (10). The water level controller includes a vertical pipe (40, 70) to which the water is fed from a feed water pipe (14, 20, 22a, 22b), and is structured so as to regulate the feed water in accordance with the water level within the vertical pipe. A float (54, 74) is provided within the vertical pipe, and rises and falls in accordance with the water level within the vertical pipe. Further, if the float rises, a valve body (60, 80) and a valve seat (48, 82) come into contact with each other so as to close the feed water port (50, 84), and if the float moves down, the valve body and the valve seat come away from each other so as to open the feed water port, thereby keeping the water level within the vertical pipe at a desired water level. For example, if the water level controller is arranged within the water-impervious member (16) so as to make the water level (28) of the gravitational water within the water-impervious member and the water level within the vertical pipe work with each other, it is possible to keep the water level of the gravitational water at a desired water level, and it is possible to form the soil portion (30) in the capillary water state having the proper water content in the cultivated land (200) or the like.

A sixteenth aspect of the invention is the a water level controller dependent on the fifteenth aspect of the invention, and the float comes into contact with an end of the feed water pipe so as to close the feed water port at a time when the water level within the vertical pipe is equal to or more than the set water level, and comes away from the end of the feed water pipe so as to open the feed water port at a time when the water level within the vertical pipe is less than the set water level.

In the sixteenth aspect of the invention, the float (74) is arranged in a state of being simply put within the vertical pipe (70), for example, at a position that is below the end (82) of the feed water pipe (14, 22b) fixed by a water level setting device (72). Further, the float moves up and down in accordance with the water level within the vertical pipe, and keeps the water level within the vertical pipe to the desired water level by coming into contact with the end (82) of the feed water pipe so as to close the feed water port (84) in the case that the water level within the vertical pipe is equal to or more than the set water level, and coming away from the end of the feed water pipe so as to open the feed water port in the case that the water level within the vertical pipe is less than the set water level. A general-purpose product can be utilized for the vertical pipe, the float, the water level setting device and the like mentioned above.

In accordance with the sixteenth aspect of the invention, it is possible to provide the water level controller that can be simply and inexpensively manufactured by combining only the general-purpose products.

A seventeenth aspect of the invention is a double-pipe unit used in a subirrigation system according to any one of the first to fourteenth aspects of the invention, and continuously provided in the ground of a cultivated land, including: a water-impervious member formed into a horizontal pipe shape having an opening in an upper surface; a pipe member provided in an inner portion of the water-impervious member; and a connection member provided at least one end portion of the water-impervious member, and connecting the pipe member and the other pipe member as well as connecting the water-impervious member and the other water-impervious member.

In the seventeenth aspect of the invention, the double-pipe unit is used in the subirrigation system (10), and is provided continuously in the ground of the cultivated land in such a manner as to extend to near both the ends of the cultivated land (200). The double-pipe unit is provided with the water-impervious member (16) formed into a horizontal pipe shape having an opening (98) in its upper surface, and the pipe member (100, 138) is provided in the inner portion of the water-impervious member. Further, a connection member (110) is provided in an end portion of the water-impervious member. The connection member connects the water-impervious member to the other water-impervious member, and connects the pipe member to the other pipe member.

In accordance with this invention, since a water-permeating function of the soil itself is utilized, the reduction of the water-permeating function due to the clogging is not generated, and it is easy to maintain and control.

Further, since the water level of the gravitational water is controlled in the feed water side, any waste water is not fed, and it is possible to efficiently utilize the water resource.

The above described objects and other objects, features, and advantages of the present invention will become more apparent from the following detailed description of preferred embodiments when taken in conjunction with the accompanying drawings.

BRIEF DESCRIPTION OF THE DRAWINGS

FIG. 9 is a schematic cross-sectional view showing a motion of a water level controller in FIG. 7, wherein FIG. 9(A) shows a state that a feed water port is open, and FIG. 9(B) shows a state that the feed water port is closed.

BEST MODE FOR PRACTICING THE INVENTION

Figure 1:
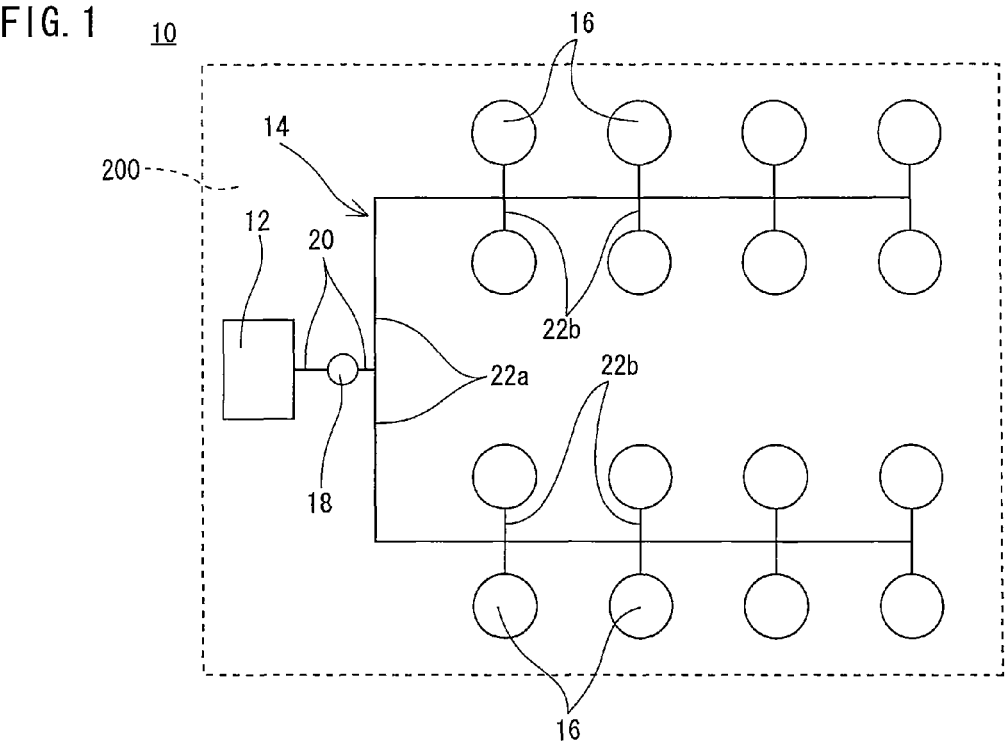
FIG. 1 is an illustrative diagram showing an embodiment of a subirrigation system in accordance with this invention.

With reference to FIG. 1, a subirrigation system 10 (hereinafter, refer simply to as a "system 10") in accordance with an embodiment of this invention is provided with a water tank 12, a feed water pipe 14, a water-impervious member 16 and a water level controller 18, is applied to a cultivated land 200 or the like, and keeps water content in soil in a proper state for growing a plant by feeding water from the underground.

The water tank 12 is installed on the ground, and reserves the water for feeding to the cultivated land 200. The water tank 12 is connected, for example, to an agricultural water piping (not shown) or the like, and reserves the water fed from the agricultural water piping in an inner portion thereof. An amount of the water reserved in the water tank 12 is appropriately set based on an area of the cultivated land 200, or the like, and a predetermined amount or more water is always reserved within the water tank 12. For example, the water may be automatically replenished from the agricultural water piping if a water level within the water tank 12 is below the predetermined water level, or the water may be appropriately replenished by manually opening and closing a stopcock.

The feed water pipe 14 is a pipe line feeding the water within the water tank 12 to an inner portion of the water-impervious member 16, and includes a main pipe 20 connected to the water tank 12, and a branch pipe 22 branched from the main pipe 20. Further, the branch pipe 22 includes a first branch pipe 22a connected to the main pipe 20, and second branch pipes 22b extending to the water-impervious member 16 while branching further from the first branch pipe 22a, and feeding the water to the inner portion of the water-impervious member 16. The feed water pipe 14 is formed of synthetic resin such as vinyl chloride, and metal such as stainless steal, and is formed by appropriately coupling a plurality of straight pipes, flexible pipes and joints.

Figure 2:
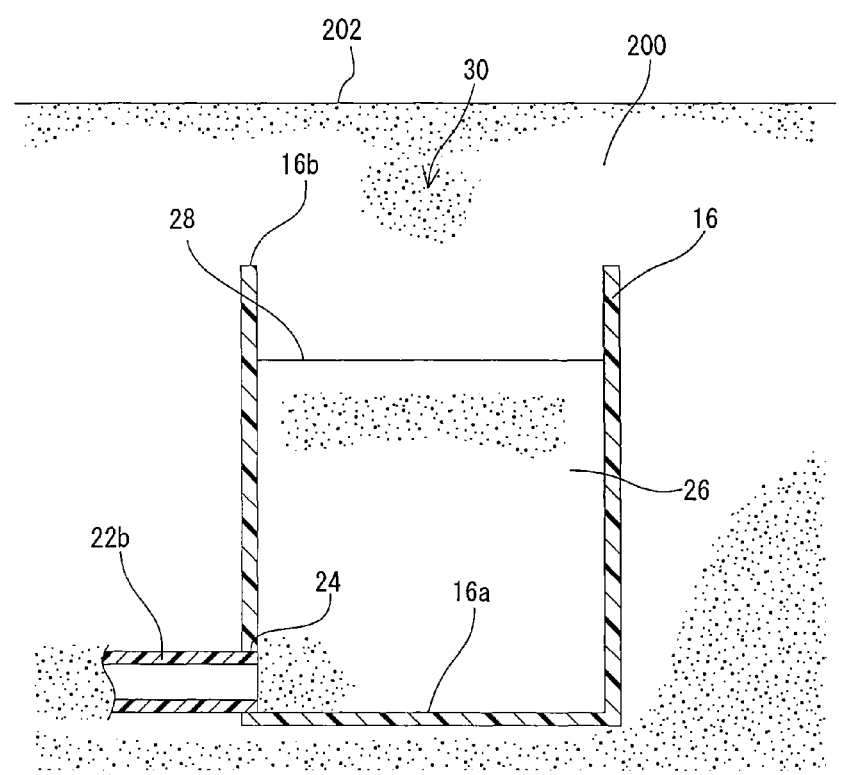
FIG. 2 is a schematic cross-sectional view showing a condition around a water-impervious member of the subirrigation system in FIG. 1.

The water-impervious member 16 is formed into an upper opening vessel shape, by a material having a seepage control property such as synthetic resin and metal, as shown in FIG. 2, and is buried in the ground. In this embodiment, the water-impervious member 16 is formed into a bottomed cylindrical shape, and a plurality of (for example, sixteen) water-impervious members 16 are arranged in a dispersing manner in the ground of the cultivated land 200. As the water-impervious member 16, for example, it is preferable to use structure obtained by forming a bottom in a general-purpose polyvinyl chloride pipe made of vinyl chloride by a cap or the like. An inner diameter of the water-impervious member 16 is, for example, between 50 mm and 500 mm, and a height thereof is, for example, between 50 mm and 300 mm. Further, a distance from a bottom surface 16*a* of the water-impervious member 16 to a ground surface 202 is, for example, between 100 mm and 500 mm, and a distance between the water-impervious members 16 is, for example, between 0.5 m and 2.0 m. In this case, a magnitude, an arranged number, an arranged depth, an arranged distance and the like of the water-impervious member 16 are not limited to these numerical values, but can be appropriately set in accordance with an area, a soil component, and a climatic condition of the cultivated land 200 to which the system 10 is applied. This is also applied to each of the other embodiments mentioned later. For example, in a case that it is not necessary to till after planting trees or the like, the water-impervious member 16 can be laid underground shallow just near a planting hole.

Further, a connection port 24 is formed in a lower portion of a side surface of the water-impervious member 16, and the second branch pipe 22*b* is connected to the connection port 24. Further, soil containing the same component as neighboring soil is filled in the inner portion of the water-impervious member 16. As mentioned later in detail, if the water is fed to the inner portion of the water-impervious member 16 from the second branch pipe 22*b*, a soil portion 26 in a gravitational water state is formed there.

It should be noted that, since the water-impervious member 16 is formed into the upper opening vessel shape, as mentioned above, the inner portion of the water-impervious member 16 in this case is a concept included in the upper side of the water-impervious member 16. Further, the water-impervious member 16 of course comes about having the soil in its upper side by being laid underground, and comes about having the soil in its upper side by the soil being filled in the inner portion of the water-impervious member 16.

Figure 3:
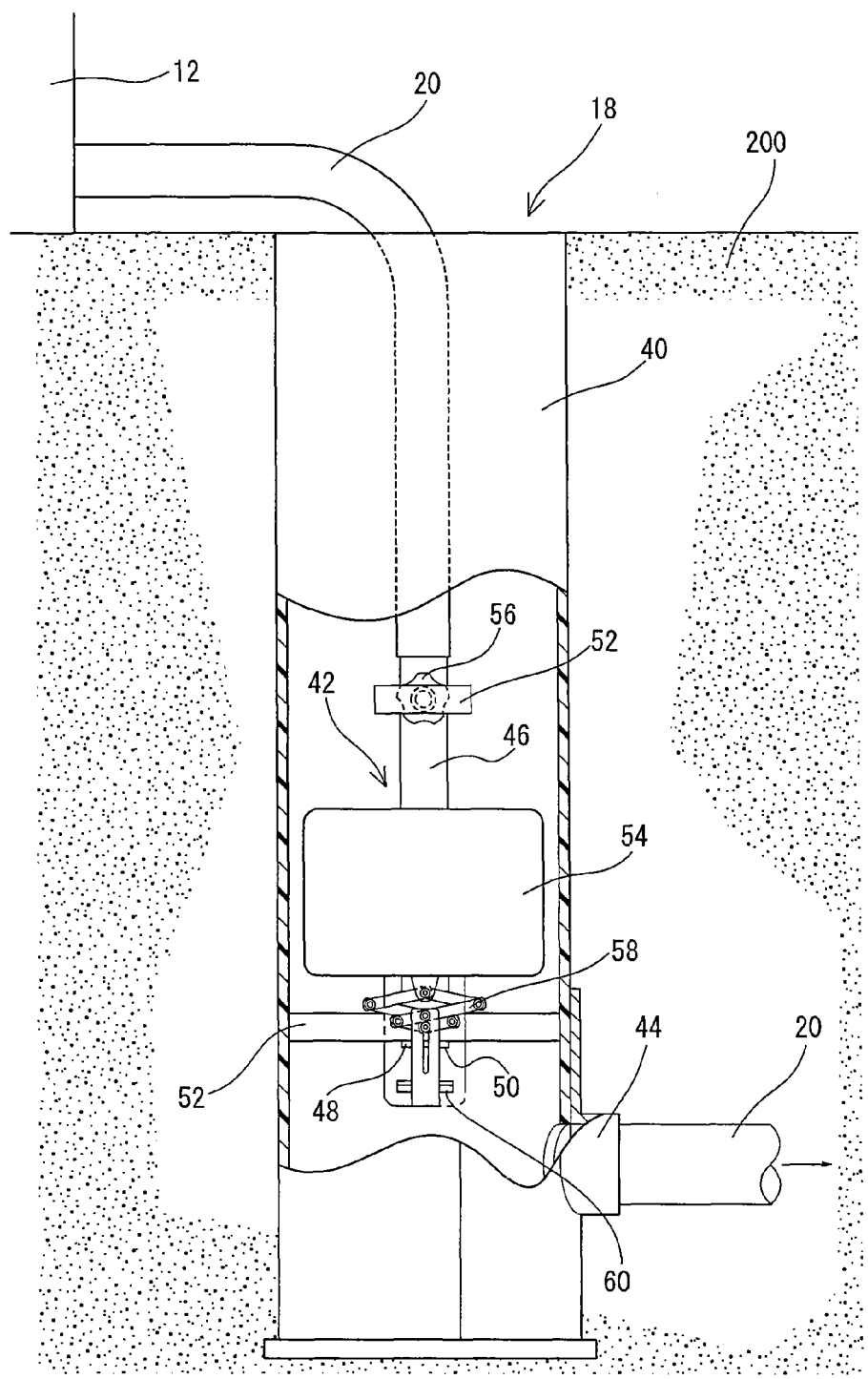
FIG. 3 is a schematic cross-sectional view showing a condition around a water level controller of the subirrigation system in FIG. 1.

Further, the water level controller 18 is provided in the feed water pipe 14. The water level controller 18 includes a vertical pipe 40 having a water reserving function, and a controller main body 42 accommodated in an inner portion of the vertical pipe 40, as shown in FIG. 3, and is structured so as to regulate a feed water in accordance with a water level within the vertical pipe 40. In this embodiment, the water level controller 18 is provided in the main pipe 20 (that is, in a feed water side), and controls a water level 28 of the gravitational water of the soil portion 26 in the gravitational water state formed in the inner portion of the water-impervious member 16, by regulating the feed water to the branch pipe 22 from the main pipe 20, as details thereof being mentioned below.

The vertical pipe 40 is formed into a bottomed cylindrical shape by synthetic resin such as vinyl chloride. An upper portion of the vertical pipe 40 is open, the main pipe 20 in an upstream side is inserted from the opening, and the main pipe 20 and the controller main body 42 are connected. Further, a pipe connection portion 44 is formed in a side wall lower portion of the vertical pipe 40, and the main pipe 20 in a downstream side is connected to the pipe connection portion 44. Accordingly, the main pipe 20 is changed its installed height in the vicinity of the water level controller 18.

The controller main body 42 includes a shaft portion 46, and the shaft portion 46 is formed into a straight pipe shape by metal, synthetic resin or the like. One end portion of the shaft portion 46 is a connection portion for connecting the main pipe 20 in an upstream side and the controller main body 42. Further, the other end of the shaft portion 46 is used as a valve seat 48 receiving a valve body 60 mentioned below, and an opening in the other end is used as a feed water port 50 feeding the water into the vertical pipe 40.

Further the controller main body 42 is provided with a shaft fixing device 52 and a float 54, and they are arranged around the shaft portion 46. The shaft fixing device 52 is formed into a flat plate shape by synthetic resin or the like, and is attached to each of an upper portion and a lower portion of the shaft portion 46. The two shaft fixing portions 52 are arranged in such a manner they extend in a mutually orthogonal direction, and both end portions thereof come into contact with each other in such a manner as to be along an inner surface of the vertical pipe 40, thereby preventing the shaft portion 46 from being inclined. Further, the upper side shaft fixing portion 52 is provided with a length adjusting portion 56 for finely adjusting a length thereof.

The float 54 is a buoy that is arranged above the feed water port 50, and rises and falls in accordance with a water level fluctuation within the vertical pipe 40, and is formed into a hollow ring shape by synthetic resin such as vinyl chloride. The shaft portion 46 is inserted to a hole that is formed so as to pass through a center portion of the float 54, and the float 54 moves (rises and falls) along the shaft portion 46.

Further, the valve body 60 is coupled to the float 54 via a link mechanism 58. The valve body 60 is arranged below the feed water port 50, comes into contact with the valve seat 48 so as to close the feed water port 50 if the float 54 rises, and comes away from the valve seat 48 so as to open the feed water port 50 if the float 54 falls. The valve body 60 is formed into a disc shape by metal, synthetic resin and the like, and an upper surface thereof is covered by an elastic material such as ethylene propylene rubber in such a manner as to come into contact with the valve seat 48 with no gap.

The link mechanism 58 is structured so as to transfer the motion of the float 54 to the valve body 60 and make a motion of the float 54 work with a motion that the valve body 60 opens and closes the feed water port 50. The link mechanism 58 is formed by combining a plurality of arms or the like formed into a flat rod shape by metal, synthetic resin and the like, and amplifies a force that the float 54 moves so as to transfer to the valve body 60 by utilizing the principle of leverage. In other words, it is possible to press the valve body 60 and the valve seat 48 by a strong force by employing the link mechanism 58, making it possible to properly close the feed water port 50.

In the case that the water level controller 18 is provided in the main pipe 20, first of all, the vertical pipe 40 is arranged in the ground, and the downward side main pipe 20 is connected to the pipe connection portion 44 of the vertical pipe 40. Next, the controller main body 42 is put within the vertical pipe 40, and the position of the controller main body 42 is adjusted to a desired position (height) within the vertical pipe 40. In other words, the position of the controller main body 42 is adjusted to such a position that the float 54 rises, the valve body 60 comes into contact with the valve seat 48 and the feed water port 50 is closed, at a time when the water level within the vertical pipe 40 comes to a predetermined water level set water level. Further, the controller main body 42 is fixed to a desired position within the vertical pipe 40 by adjusting the length adjusting portion 56 so as to elongate the length of the upper shaft fixing portion 52, making the shaft fixing portion 52 be tensile in an inner surface of the vertical pipe 40, and fixing the shaft portion 46 within the vertical pipe 40. Further, the main pipe 20 in the upstream side is connected to one end portion of the vertical pipe 40.

In the system 10 mentioned above, the water within the water tank 12 is fed into the vertical pipe 40 via the main pipe 20 and the shaft portion 46 in accordance with a natural falling utilizing a water level difference (for example, a water level difference of about 1 m) between the water level within the water tank 12 and the water level within the vertical pipe 40. The water fed within the vertical pipe 40 is fed to an inner portion of the water-impervious member 16 further via the main pipe 20 and the branch pipe 22. Since the water-impervious member 16 is formed into an upper opening vessel shape, that is, has a water reserving function, the water fed to the inner portion of the water-impervious member 16 permeates into the soil in the inner portion thereof, and comes to the gravitational water so as to be reserved in the inner portion of the water-impervious member 16. Accordingly, the soil portion 26 in the gravitational water state is formed in the inner portion of the water-impervious member 16.

The water level 28 of the gravitational water in the soil portion 26, that is, the water level 28 of the gravitational water within the water-impervious member 16 operates together with the water level within the vertical pipe 40, and the water level within the vertical pipe 40 rises in accordance with the rise of the water level 28 of the gravitational water. Further, if the water level within the vertical pipe 40 comes to a predetermined water level set water level, the feed water port 50 is closed, and the feed water from the shaft portion 46 into the vertical pipe 40 is stopped. Accordingly, the feed water into the water-impervious member 16 is stopped, and the water level 28 of the gravitational water remains in the same water level as the water level within the vertical pipe 40, that is, the predetermined water level set water level. Further, as mentioned below, if the gravitational water within the water-impervious member 16 is sucked to the upper soil, and the water level 28 of the gravitational water is lowered, the water level within the vertical pipe 40 is lowered, the feed water port 50 is opened, the feed water from the shaft portion 46 into the vertical pipe 40 is carried out, and the feed water into the water-impervious member 16 is carried out.

In other words, the water level controller 18 closes the feed water port 50 so as to stop the feed water from the main pipe 20 to the branch pipe 22 if the water level 28 of the gravitational water within the water-impervious member 16 becomes equal to or more than the set water level, and opens the feed water port 50 so as to carry out the feed water from the main pipe 20 to the branch pipe 22 if the water level 28 of the gravitational water within the water-impervious member 16 becomes less than the set water level. Accordingly, the water level controller 18 controls the feed water into the water-impervious member 16, and keeps the water level 28 of the gravitational water within the water-impervious member 16 in the set water level.

The gravitational water within the water-impervious member 16, that is, the water of the soil portion 26 is sucked into the soil in the upper side thereof in accordance with a capillary phenomenon so as to be permeated, and forms a soil portion 30 under a capillary water state in the upper soil (see FIG. 2). Since an amount of the water content of the soil portion 30 in the capillary water state changes depending on a magnitude of the water level 28 of the gravitational water within the water-impervious member 16, it is possible to properly keep the amount of the water content of the soil portion 30 in the capillary water state by keeping the water level 28 of the gravitational water at a proper position. For example, if the water level 28 of the gravitational water is regulated in correspondence to the plant cultivated in the cultivated land 200, a cultivation soil layer having optimum water content for the plant is formed in the cultivated land 200.

In this case, if a distance between the upper end 16b of the water-impervious member 16 and the upper surface of the gravitational water (that is, the position of the water level 28) is short, there is a possibility that the gravitational water keeps flowing out to the external portion of the water-impervious member 16 in accordance with a siphon phenomenon. In accordance with an experiment by the inventors of the present invention, in order to effectively utilize the gravitational water within the water-impervious member 16 for forming the soil portion 30 in the capillary water state, it is desirable that the distance between the upper end 16b of the water-impervious member 16 and the upper surface of the gravitational water is equal to or more than 3 cm, and it is desirable that it is preferably equal to or more than 6 cm, and more preferably between 16 cm and 20 cm. Accordingly, it is desirable that the shape of the water-impervious member 16 is structured such that the water level can be freely set between 3 cm and 20 cm.

In this embodiment, the water content in the soil is kept in a proper state for growing the plant by utilizing the permeating function of the soil portions 26 and 30 themselves, without using any permeation material such as a water-absorbing material. Since the soil portions 26 and 30 themselves do not clog even if they come to a dry state due to a water shortage such as a drought, the reduction of the permeating function is not generated by the clogging, and it is not necessary to clean the soil within the water-impervious member 16 or replace it. Therefore, in accordance with this embodiment, the operation and maintenance can be easily carried out.

Further, if the water is feed to the cultivated land 200 by means of a general water spray by a sprinkler or the like, that is, a surface irrigation, the fed water moistens a soil surface and a plant surface, however, since they do not relate to the growth of the plant, but only evaporate to atmospheric air (that is, surface evaporate). Accordingly, the wasting of the water is generated. Further, since the soil becomes muddy, an obstacle is generated in the work, and a trouble such as a mud splash and a solidification of the soil surface is caused. Further, in a case of house cultivation, the moisture within the house becomes excessively high due to the surface evaporating water, and there is a case that a disease generation of the plant is caused.

On the contrary, if the water is fed to the cultivated land 200 by permeating from the underground as in this embodiment, that is, the subirrigation is carried out, the fed water is not surface evaporated. Accordingly, it is possible to reduce the wasting of the water, thus making it possible to efficiently utilize the water resources. In addition, there is not generated the problem caused by the surface irrigation, such as the mud formation of the soil, and the excessive rise of the moisture within the house as mentioned above.

Further, in this embodiment, since the feed water into the water-impervious member 16 is controlled in the feed water side, and only the water that the gravitational water within the water-impervious member 16 is sucked to the upper layer in accordance with the capillary phenomenon so as to be reduced is fed, the water is not excessively fed, and it is possible to more efficiently utilize the water resources. Further, it is possible to contribute to a global warming countermeasure by efficiently utilizing the water resources as mentioned above.

Further, since the feed water into the water-impervious member 16 is controlled by the water level controller 18, and the water is fed to the soil in accordance with the capillary phenomenon, a power is not necessary. Further, in the case that the excessive water is fed to the cultivated land 200 by the rainfall or the like, the excessive water permeates deeply into the ground, it is not necessary to additionally provide equipment for discharging the excessive water. Accordingly, it is possible to simplify the system 10. In this case, in the case that the system 10 is applied to the cultivated land 200 that is immediately covered with water by the rainfall or the like, an attention is necessary, and there is a case that it is necessary to provide additionally drainage equipment.

In this case, since the capillary phenomenon is hard to be generated in the case that the soil is very dry, it is preferable to sufficiently irrigate the soil at a time of starting the cultivation so as to previously prepare a state that the capillary tubes are connected.

Further, since it is sufficient to excavate only the installed portion at a time of installing the feed water pipe 14 and the water-impervious member 16, it is possible to reduce an earthwork cost for excavating and backfilling, in comparison with a case that a whole surface of the cultivated land 200 is excavated. Further, since it is not necessary to excavate the whole surface of the cultivated land 200, it is possible to introduce the system 10 as it is without replanting any trees, by installing the feed water pipe 14 and the water-impervious member 16 between the trees, in the case that the system 10 is applied to the land that the trees are planted, thereby preventing the trees from being damaged.

Further, the plant is going to be rooted deep so as to keep a stability, in accordance that it grows up, however, since it is possible to form the soil portion 30 in the capillary water state in the cultivated land 200 to a necessary depth (thickness) for the plant, by appropriately regulating the water level 28 of the gravitational water, it is possible to preferably cultivate various plants in the cultivated land 200.

Further, if the whole surface of the underground is covered with the seepage control sheet as in the technique of Patent Document 2, the large tree cannot be rooted deep and there is generated a problem that it falls down or is adversely affected in its growing. However, if the water-impervious members 16 are arranged in the dispersing manner as in this embodiment, the problem mentioned above is dissolved, and even in the case of the large tree that is rooted deep under the ground, it is possible to preferably cultivate.

Further, since it is possible to properly keep the soil in the upper side than the soil portion 26 in the gravitational water state in the capillary water state, it is possible to preferably apply to a so-called leaky paddy filed, a sandy soil and the like that a water holding capacity is weak and rain water or the like immediately permeates deep under the ground. Further, it is possible to easily implement a rotation of a field between wet rice and other crops.

Further, the system 10 can be widely applied from one for a personal use to one having a large scale, by appropriately changing the magnitude, the installed number and the like of the water-impervious member 16, in accordance with an area of the cultivated land 200. For example, it can be used for a flower bed in the garden, can be used for greening a veranda, a rooftop and the like, and can be used for a large-scaled upland cropping and rice cropping and the like.

Figure 4:
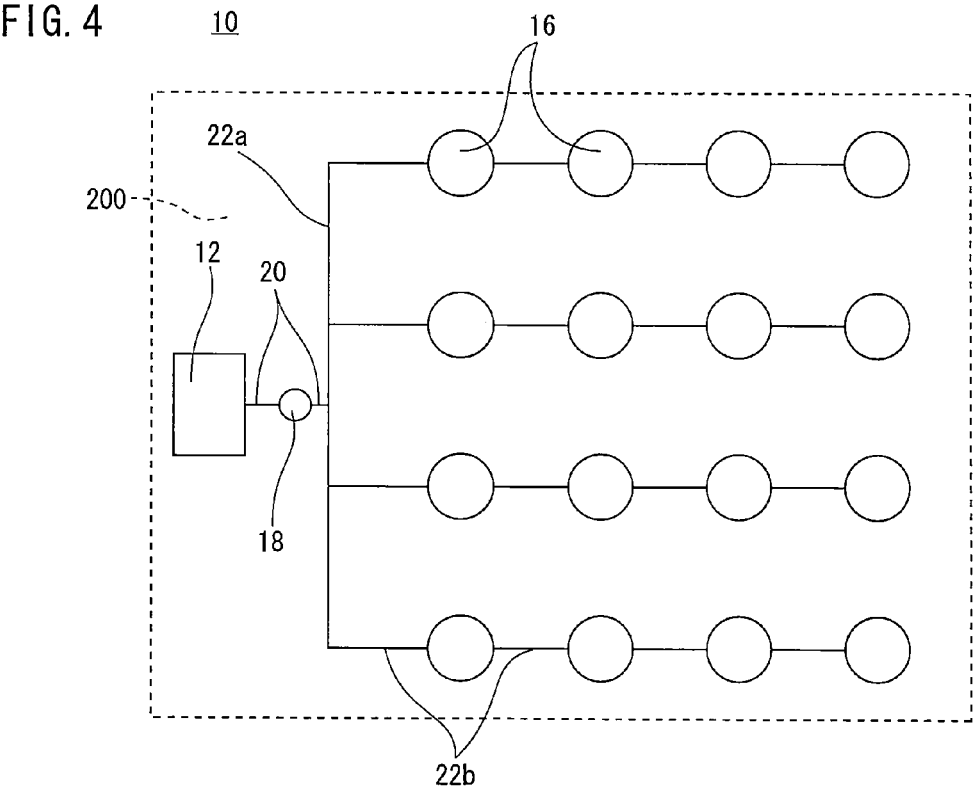
FIG. 4 is an illustrative diagram showing another embodiment of the subirrigation system in accordance with this invention.

In this case, in the embodiment mentioned above, the water-impervious member 16 is structured so as to be connected in parallel to the feed water pipe 14 (specifically the second branch pipe 22b), however, the water-impervious member 16 may be connected in series as shown in FIG. 4.

Figure 5:
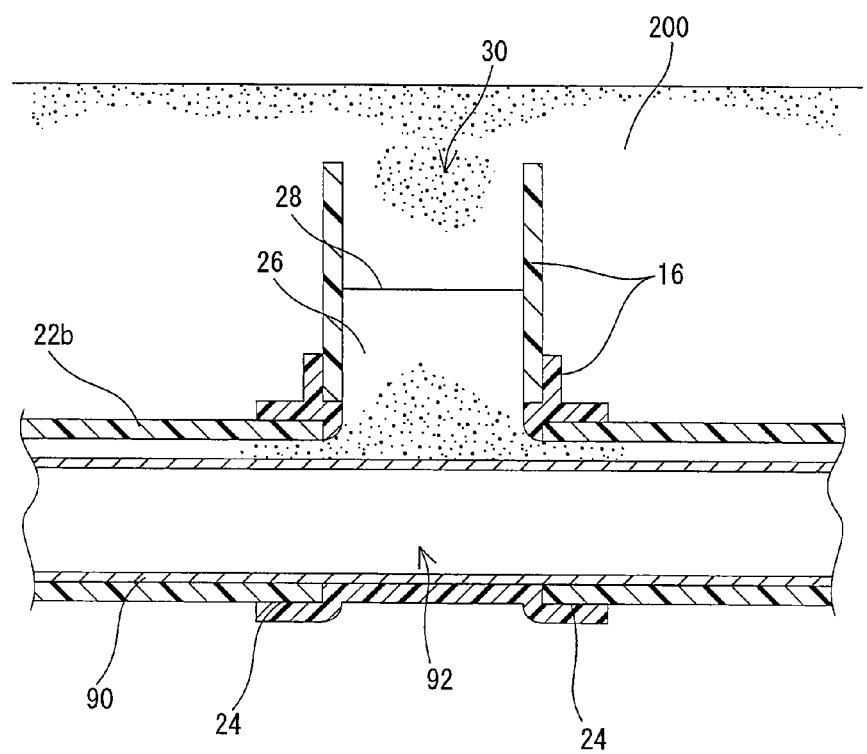
FIG. 5 is a schematic cross-sectional view showing an example of a condition around a water-impervious member of the subirrigation system in FIG. 4.

As the water-impervious member 16 in this case, for example, it is preferable to use structure obtained by connecting a T-shaped pipe joint (specifically, 90 degrees T-shaped joint or 90 degrees Y-shaped joint, or the like) to a lower end portion of a general-purpose polyvinyl chloride pipe of vinyl chloride, as shown in FIG. 5. Accordingly, since two connection ports 24 are formed in the lower portion of the side surface of the water-impervious member 16, it is possible to simply connect the water-impervious member 16 in series by connecting the second branch pipe 22b to each of the connection ports 24.

In this case, if the soil is charged into the inner portion of the water-impervious member 16, the flow of the water within the second branch pipe 22b is shut off there, and there is a risk that the water cannot be properly fed to the following water-impervious member 16.

Accordingly, in the embodiment shown in FIG. 4, the respective water-impervious members 16 may be connected to each other by the feed water pipe 14, however, it is possible to structure so as to be provided with a perforated pipe 90 passing through the inner portions of the second branch pipe 22b and the water-impervious member 16, as shown in FIG. 5. The perforated pipe 90 forms a water channel 92 passing through the inner side of the water-impervious member 16, feeds the water flowing through the inner portion into the water-impervious member 16 via many fine holes (not shown) formed in a pipe wall thereof, and forms the soil portion 26 in the gravitational water state within the water-impervious member 16. In other words, the perforated pipe 90 serves as a feed water member for forming the water channel 92 passing through the inner side of the water-impervious member 16. At this time, the water level 28 of the gravitational water is controlled in such a manner as to be at a higher position than the fine hole of the perforated pipe 90.

In this case, if the water level 28 of the gravitational water is appropriately controlled in such a manner as to be above the perforated pipe 90, the perforated pipe 90 always comes to a full-water state, and does not come into contact with the air. Accordingly, iron oxide is hard to be attached. Further, the water flow heads for an external portion from an internal portion of the perforated pipe 90. Accordingly, in the embodiment shown in FIG. 5, the perforated pipe 90 is hard to be clogged in comparison with the technique of Patent Document 2. In other words, even if the perforated pipe 90 is used, a burden for operation and maintenance does not increase very large.

In this case, even if the water does not exist up to an upper end of the perforated pipe 90, the water is fed from a circumferential surface of the perforated pipe 90 as far as a fixed water level is kept within the perforated pipe 90. Therefore, it is not exactly necessary to set the perforated pipe 90 in the full-water state.

Figure 6:
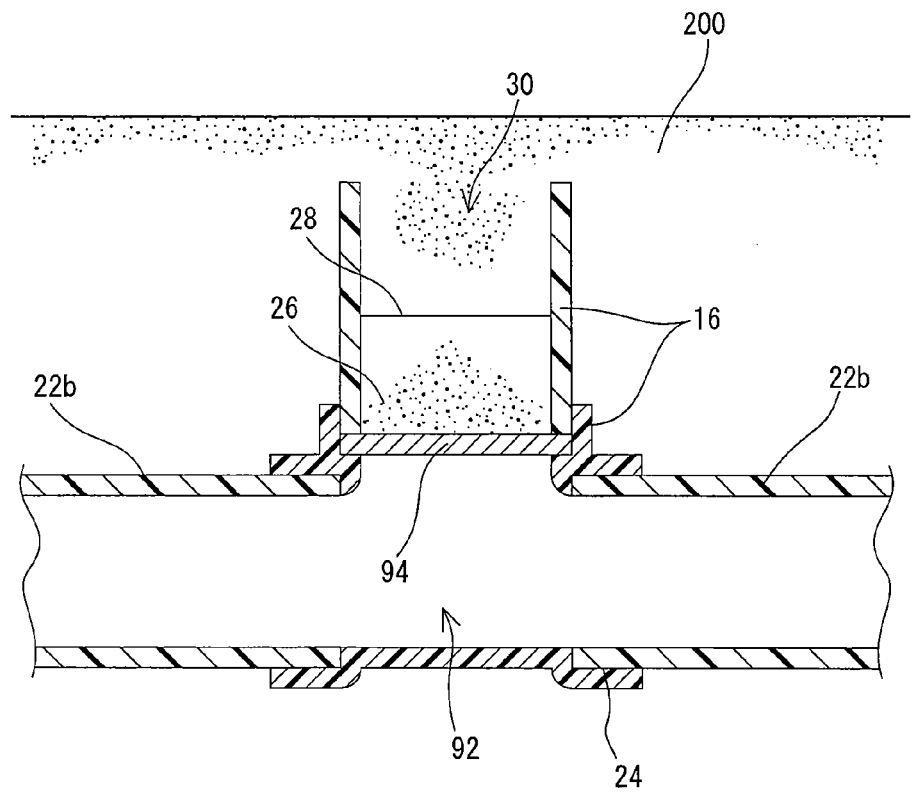
FIG. 6 is a schematic cross-sectional view showing another example of the condition around the water-impervious member of the subirrigation system in FIG. 4.

Further, in the embodiment shown in FIG. 5, the water channel 92 is formed by using the perforated pipe 90, however, it is not necessarily limited thereto. For example, it is possible to form a water channel 92 that passes through the inner portion of the water-impervious member 16 and communicates the inner portions of the adjacent second branch pipes 22b with each other, by using a perforated plate 94, as shown in FIG. 6. In this case, for example, the perforated plate 94 may be provided in such a manner as to be sandwiched between the polyvinyl chloride pipe and the pipe joint, at a time of connecting the T-shaped pipe joint to the lower end portion of the polyvinyl chloride pipe so as to form the water-impervious member 16. In this water-impervious member 16, the soil is charged on the perforated plate 94. Further, the water flowing through the water channel 92 is fed to the soil within the water-impervious member 16 via many fine holes formed in the perforated plate 94, whereby the soil portion 26 in the gravitational water state is formed within the water-impervious member 16. In other words, the T-shaped pipe joint in this case also serves as a member forming the feed water pipe 14 connected to the lower end of the vertical pipe-shaped water-impervious member 16. Further, the perforated plate 94 is a feed water member for forming the water channel 92, and also serves as a water-permeable member for keeping the soil portion 26 within the vertical pipe-shaped water-impervious member 16.

In the embodiment shown in FIG. 6 also, if the water level 28 of the gravitational water is appropriately controlled in such a manner as to be above the perforated plate 94, that is, if the state is kept that the soil portion 26 in the gravitational water state is always formed within the water-impervious member 16, the perforated plate 94 is hard to be clogged in the same manner as the embodiment shown in FIG. 5, and the burden for operation and maintenance does not become very large.

Further, in each of the embodiments mentioned above, the structure is made such that one water level controller 18 is provided in the main pipe 20 of the feed water pipe 14, and the water level 28 of the gravitational water within all the water-impervious members 16 is collectively controlled, however, the structure is not limited thereto. For example, the water level controller 18 may be provided in each of the first branch pipes 22a, and the water level 28 of the gravitational water may be controlled for each of a plurality of water-impervious members 16. Since a connecting method between each of the water level controllers 18 and each of the first branch pipes 22a is obtained only by changing the main pipe 20 in FIG. 3 to each of the first branch pipes 22a, a detailed description thereof will be omitted. In this case, the installed height of each of the first branch pipes 22a is changed in the vicinity of each of the water level controllers 18, and the water level 28 of the gravitational water within a plurality of water-impervious members 16 provided in a downstream side is collectively controlled by each of the water level controllers 18.

Figure 7:
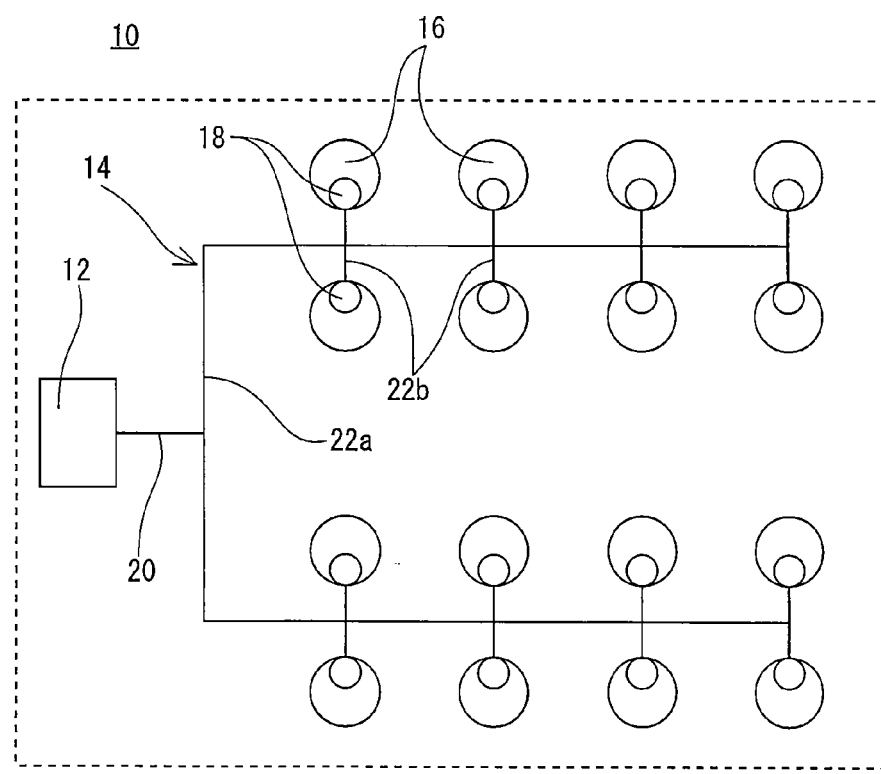
FIG. 7 is an illustrative diagram showing still another embodiment of the subirrigation system in accordance with this invention.
Figure 8:
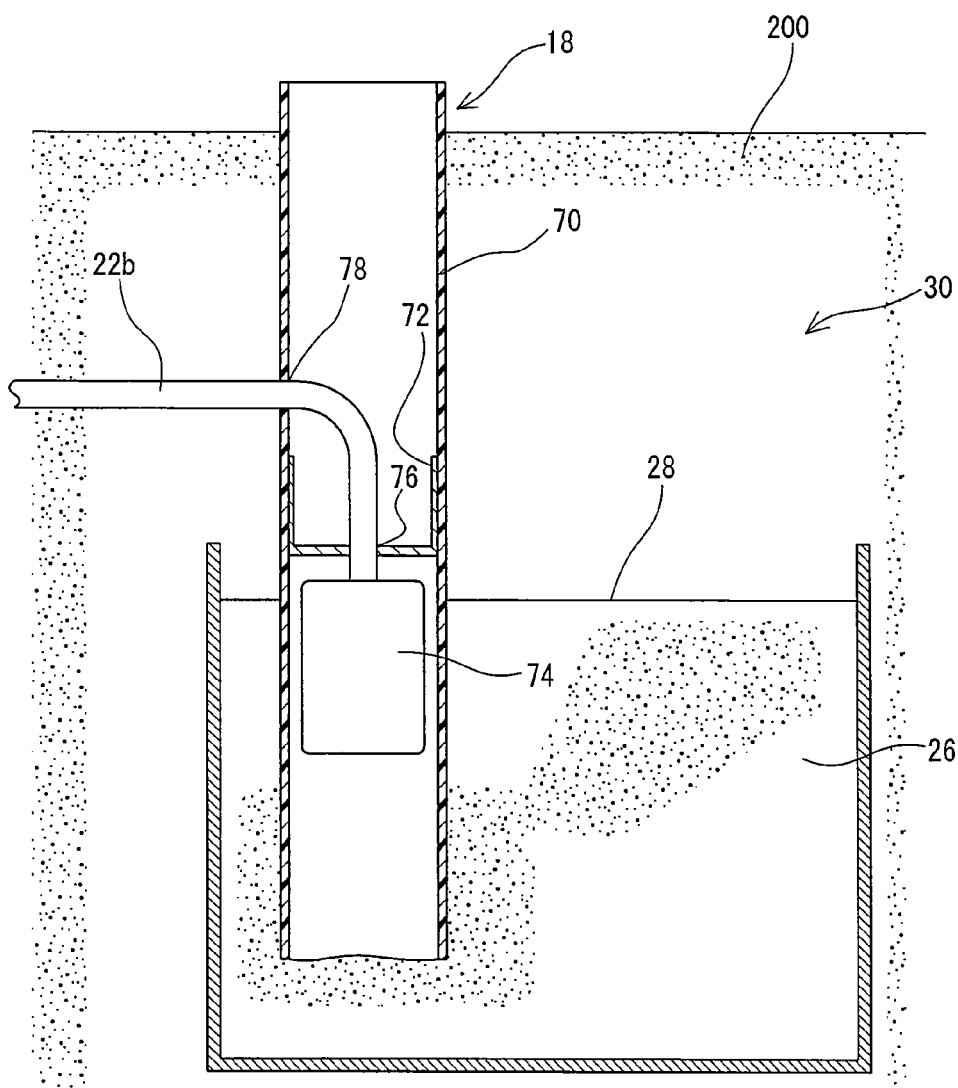
FIG. 8 is a schematic cross-sectional view showing a condition around a water-impervious member of the subirrigation system in FIG. 7.
Figure 9:
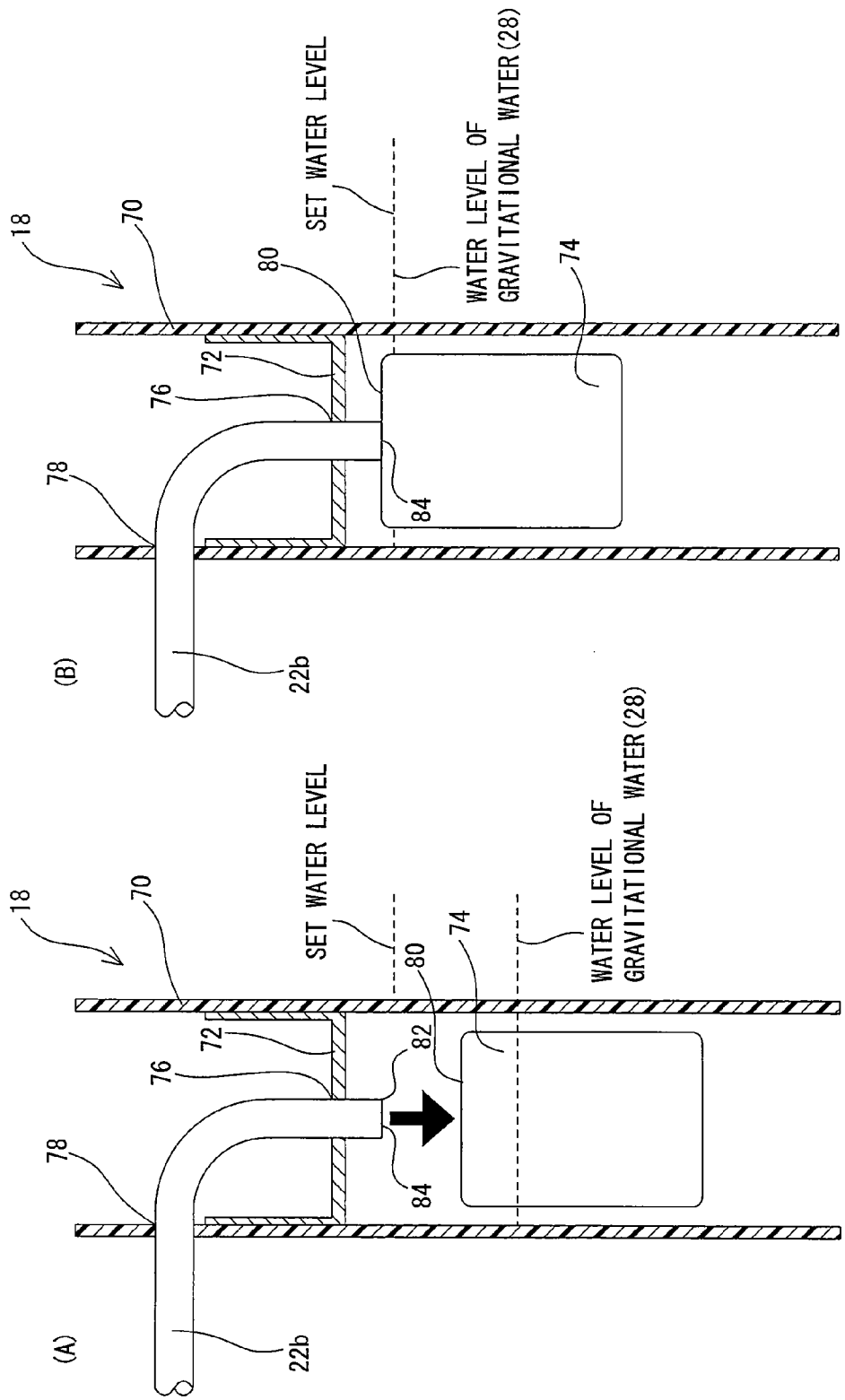

Further, as shown in FIG. 7, the water level controller 18 may be provided per the second branch pipe 22b, that is, per the water-impervious member 16, and it is possible to individually control the water level 28 of the gravitational water within each of the water-impervious members 16. In this case, a simplified water level controller 18 as shown in FIGS. 8 and 9 may be used. In this case, a description of the overlapping portions mentioned above will be omitted or simplified. This also applies to each of embodiments mentioned below.

The simplified water level controller 18 includes a vertical pipe 70, is provided in an end portion of the feed water pipe 14 (the second branch pipe 22b in this embodiment), and regulates the feed water in accordance with the water level within the vertical pipe 70. The vertical pipe 70 is formed into a both-end opened cylindrical shape by synthetic resin such as vinyl chloride, and an inner diameter thereof is, for example, 40 mm. As the vertical pipe 70, a general-purpose polyvinyl chloride pipe of vinyl chloride or the like may be used. Further, a water level setting device 72 and a float 74 are provided in an inner portion of the vertical pipe 70.

The water level setting device 72 is arranged within the vertical pipe 70, and is structured so as to regulate a water level set water level within the vertical pipe 70 based on an arranged height. The water level setting device 72 is formed into a bottomed cylindrical shape, and an outer diameter thereof is set to be approximately the same as the inner diameter of the vertical pipe 70 so as to be arranged at a desired position (height) within the vertical pipe 70. Further, a through hole 76 is formed in a bottom surface of the water level setting device 70. As the water level setting device 72, a general-purpose vinyl chloride cap may be used.

Further, a through hole 78 is formed at a higher position than the water level setting device 72, in a side wall of the vertical pipe 70. An end portion of the second branch pipe 22b passing through the underground from the through hole 78 is inserted into the vertical pipe 70, and the end portion of the second branch pipe 22b is inserted further to the through hole 76 of the water level setting device 72, and is fixed in such a manner as to protrude toward a lower side from the water level setting device 72. An end of the second branch pipe 22b serves as a valve seat 82 coming into contact with an upper surface 80 of the float 74 mentioned below, and an opening thereof comes to a feed water port 84 feeding the water into the vertical pipe 70.

The float 74 is arranged below the water level setting device 72, and rises and falls according to a water level fluctuation within the vertical pipe 70, and the upper surface 80 thereof serves as a valve body coming into contact with the valve seat 82 so as to close the feed water port 84. The float 74 is formed into a hollow columnar shape by an elastic material such as rubber, and synthetic resin, and an outer peripheral surface thereof extends along an inner peripheral surface of the vertical pipe 70 so as to be slightly spaced. In other words, the float 74 is arranged in a state of being simply inserted into the vertical pipe 70, at a position that is below the feed water port 84 (the end of the feed water pipe 14), and is guided by the vertical pipe 70 so as to be moved. In this case, in the upper surface 80 of the float serving as the valve body, it is necessary to form at least a position coming into contact with the valve seat 82 by an elastic material such as rubber. This is because the upper surface 80 (the valve body) of the float 74 and the end (the valve seat 82) of the second branch pipe 22b come into contact with each other with no gap, whereby it is possible to properly close the feed water port 84, even in the case that the rising force of the float 74 is weak. As the float 74, it is possible to utilize a polystyrene vessel for a lactic acid bacteria beverage, a PET bottle or the like, and it is preferable to form the upper surface 80 serving as the valve body by sealing the upper opening with an elastic material such as a rubber sheet.

As mentioned above, the simplified water level controller 18 can be simply and inexpensively manufactured by combining only the general-purpose products. In this case, in place of making the end itself of the second branch pipe 22b serve as the valve seat 82 by protruding the end of the second branch pipe 22b from the through hole 76 formed in the bottom surface of the water level setting device 72, as mentioned above, a cylindrical shaft portion is formed in the bottom surface of the water level setting device 72 so as to protrude upward and downward and being open in both ends, and the end of the second branch pipe 22b may be connected to the upper portion of the shaft portion. In this case, a lower end of the shaft portion corresponds to the end of the feed water pipe 14 and serves as the valve seat 82 coming into contact with the upper surface 80 of the float 74, and a lower end opening serves as the feed water port 84 feeding the water into the vertical pipe 70. Further, in place of the structure that the through hole 78 is provided in the side wall of the vertical pipe 70, and the second branch pipe 22b passing through the underground is inserted into the vertical pipe 70 therefrom, the second branch pipe 22b may be arranged along the ground surface 202, and the second branch pipe 22b may be inserted into the vertical pipe 70 from the upper opening of the vertical pipe 70. Further, an appropriate lid may be installed to the upper opening of the vertical pipe 70.

A description will be given of an example of a method of setting the simplified water level controller 18 in the water-impervious member 16. First, when the water-impervious member 16 is arranged in the ground, the soil is filled up to a predetermined height within the water-impervious member 16, and the vertical pipe 70 is placed in a rising manner on the soil. Next, after the float 74 is put in the vertical pipe 70, the water level setting device 72 is fixed to a desired position (height) within the vertical pipe 70. In other words, the water level setting device 72 is fixed to a position that the float 74 rises, the upper surface 80 thereof comes into contact with the valve seat 82, and the feed water port 84 is closed when the water level within the vertical pipe 70 comes to a predetermined water level set water level. Subsequently, the second branch pipe 22b is inserted to the through hole 78 of the vertical pipe 70 and the through hole 76 of the water level setting device 72, and the end of the second branch pipe 22b is protruded to the lower side of the vertical pipe 70 so as to be fixed. Finally, the soil is filled in the internal remainder of the water-impervious member 16 and the circumference thereof and the vertical pipe 70 is fixed.

In this case, the set water level can be set by changing a buried depth (an arranged height) of the vertical pipe 70 within the water-impervious member 16, in place of being set by changing the arranged position of the water level setting device 72 within the vertical pipe 70. For example, in the case that the water level setting device 72 and the end portion (the feed water port 84) of the feed water pipe 14 are previously fixed to a predetermined position within the vertical pipe 70, and the vertical pipe 70 is arranged within the water-impervious member 16, it is possible to set the set water level to a desired position by appropriately adjusting the arranged height. In this case, it is not exactly necessary to provide the water level setting device 72, but it is sufficient to provide a fixing device for fixedly providing the feed water port 84 at a predetermined position within the vertical pipe 70.

If the simplified water level controller 18 is provided in each of the water-impervious members 16 as mentioned above, the water flowing through the second branch pipe 22b flows into the vertical pipe 70 and is fed into the water-impervious member 16, as shown in FIG. 9(A). The water fed into the water-impervious member 16 permeates into the soil, and comes to the gravitational water so as to stay within the water-impervious member 16. Accordingly, the soil portion 26 in the gravitational water state is formed within the water-impervious member 16. The water level 28 of the gravitational water within the water-impervious member 16 is identical to the water level within the vertical pipe 70, and if the water level 28 of the gravitational water reaches the set water level, the feed water port 84 is closed, and the feed water from the second branch pipe 22b into the vertical pipe 70 is stopped, as shown in FIG. 9(B). Further, if the gravitational water within the water-impervious member 16 is sucked up into the upper soil, and the water level 28 of the gravitational water is lowered to the set water level, the feed water port 84 is opened and the feed water from the second branch pipe 22b into the vertical pipe 70 is carried out, as shown in FIG. 9(A).

Figure 10:
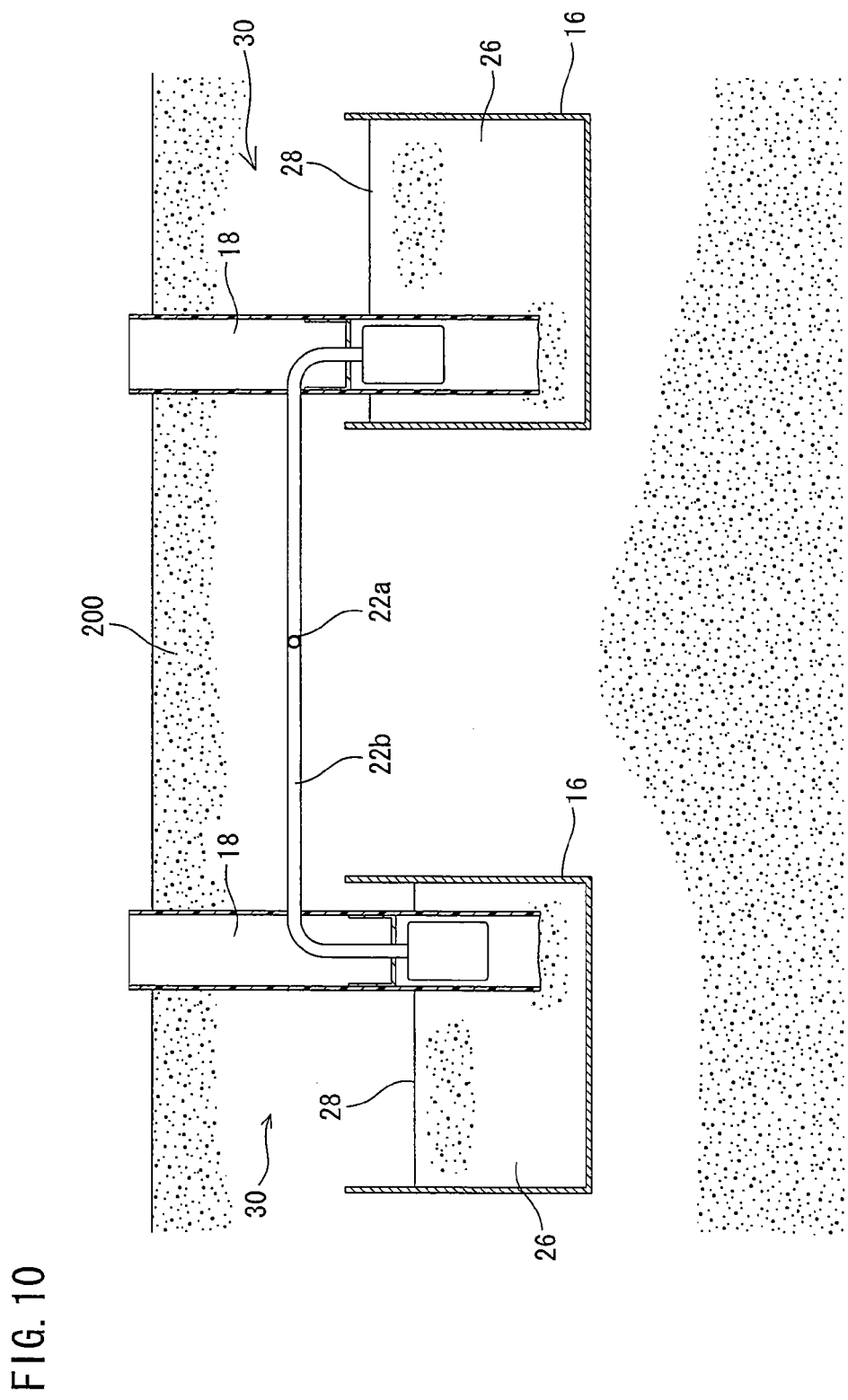
FIG. 10 is a schematic cross-sectional view showing a condition that a water level of gravitational water is changed for each of water-impervious members, in the subirrigation system in FIG. 7.

As mentioned above, in accordance with the embodiment shown in FIG. 7, since it is possible to individually regulate the water level 28 of the gravitational water within each of the water-impervious members 16, for example as shown in FIG. 10, it is possible to form the soil portion 30 in the capillary water state having different water content per place in the cultivated land 200 by changing the water level 28 of the gravitational water for each water-impervious member 16, or for each of a plurality of water-impervious members 16 arranged near each other. Accordingly, it is possible to simultaneously cultivate the plants that the soil water content suitable for growing are different, in the same system 10 under an appropriate condition. For example, in the cultivated land 200 of the same system 10, it is possible to cultivate cabbage in a certain range, cultivate soy bean in the other certain range, and cultivate trees in the other certain range.

In this case, in FIG. 10, the water level 28 of the gravitational water is individually changed by changing the height that the water level setting device 72 of the simplified water level controller 18 is provided, however, the buried depth of the water-impervious member 16 itself may be changed, at this time.

Figure 11:
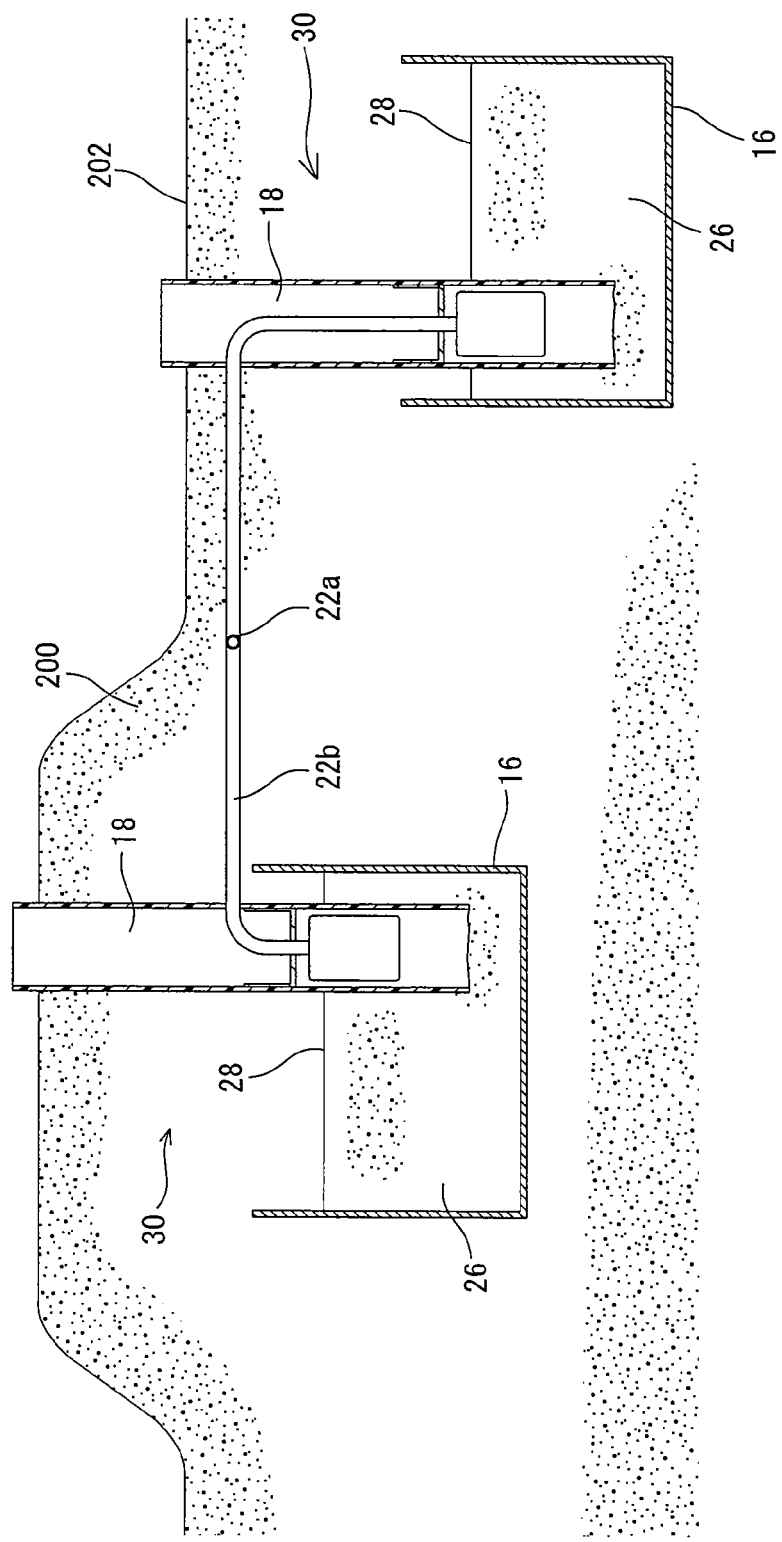
FIG. 11 is a schematic cross-sectional view showing a condition that the subirrigation system in FIG. 7 is applied to a land having a lot of rolls.

Further, it is possible to preferably apply the system 10 to the cultivated land 200 having rolls, slopes and the like on the ground surface 202, by making the water level 28 of the gravitational water individually controllable. For example, as shown in FIG. 11, if a distance between the ground surface 202 and an upper surface of the gravitational water within each of the water-impervious members 16 is fixed to an appropriate distance, it is possible to form the soil portion 30 having an optimum water content for the plant cultivated there, in the cultivated land 200 having the rolls, the slopes and the like.

Further, in each of the embodiments mentioned above, a plurality of water-impervious members 16 are arranged regularly, however, the water-impervious members 16 may be arranged at irregular positions. Further, it is possible to set a whole of the cultivated soil layer of the cultivated land 200 to the soil portion 30 in the capillary water state, by arranging the water-impervious members 16 all around the cultivated land 200, and it is possible to set only a partial range of the cultivated soil layer of the cultivated land 200, that is, only a range desired by the cultivator to the soil portion 30 in the capillary water state, by partially arranging the water-impervious members 16 in the cultivated land 200.

Further, not only the soil portion 30 in the capillary water state is formed up to the ground surface 202, but also the ground surface 202 is in a dry state, however, it is possible to set such a state that the soil portion 30 in the capillary water state is formed, in the soil depth that the plant absorbs the water. Further, it is possible to set such a state that the soil portion 30 in the capillary water state is formed in the soil depth necessary in the growing stage thereof, by appropriately adjusting the water level 28 of the gravitational water, together with the growth of the plant.

Further, it is not exactly necessary to feed the water in correspondence to up and down the water level 28 of the gravitational water. It is possible to appropriately control the water content of the soil portion 30 by intermittently feeding the water in some cases such as the condition of the soil.

Further, the component of the soil within the water-impervious member 16 is set to the same as the soil component in the circumference (the external portion), however, the soil component within the water-impervious member 16 is not particularly limited. For example, as the soil component within the water-impervious member 16, it is possible to use a soil particle having a greater particle diameter or a soil particle having a smaller particle diameter than the soil component in the circumference. Further, the soil within the water-impervious member 16 may be formed in a multiple layered state; for example, a gravelly layer, a sand layer, and a silt layer are formed in this order from the lower layer.

Figure 12:
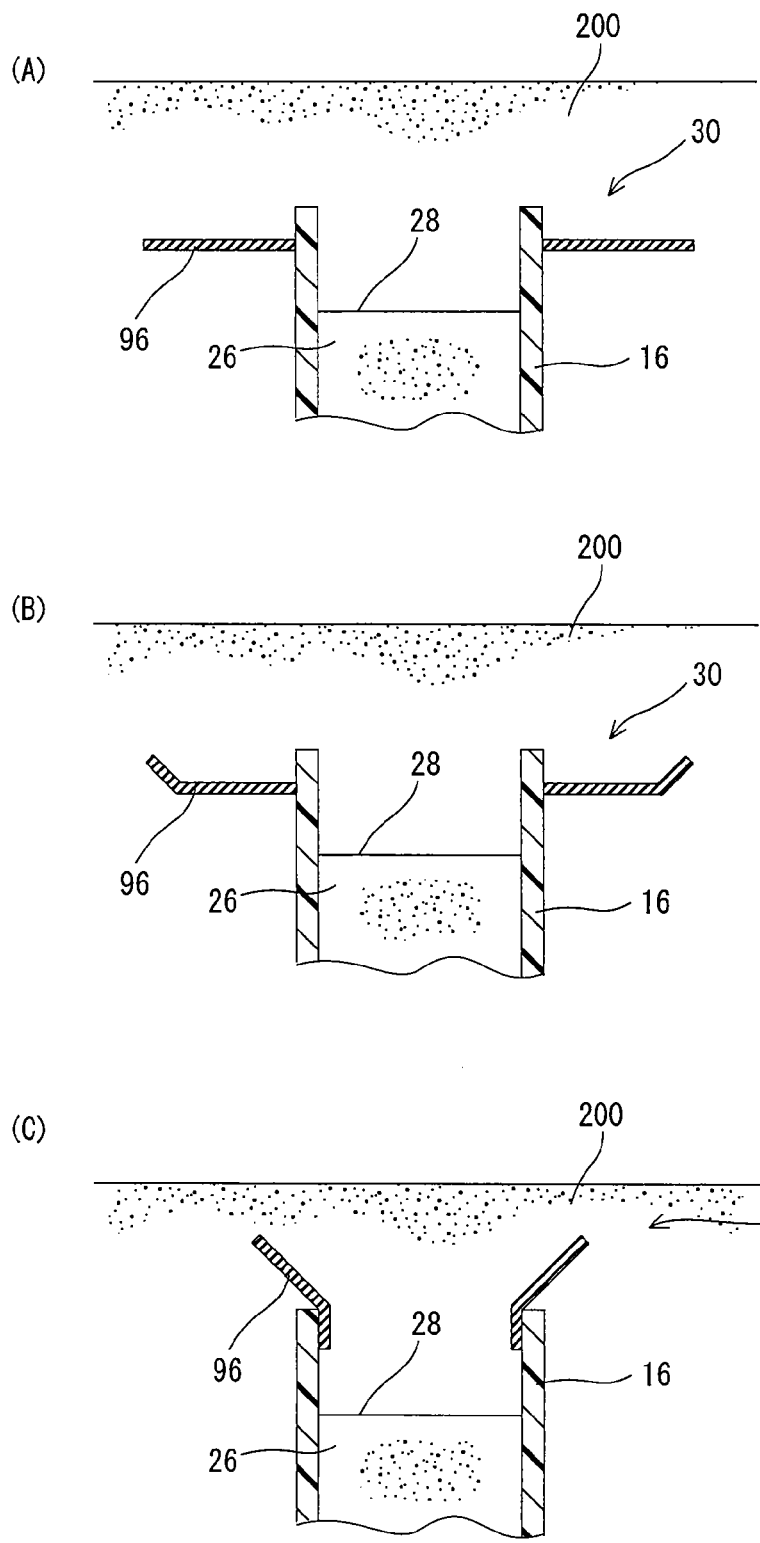
FIG. 12 is a schematic cross-sectional view exemplifying a condition that a collar-shaped member is provided in a water-impervious member used for the subirrigation system in accordance with this invention.

Further, as shown in FIG. 12, the water-impervious member 16 may be further provided with a collar-shaped member 96. The collar-shaped member 96 is formed by a material having a seepage control property such as synthetic resin and metal, and is formed in such a manner as to extend in a collar shape from the side wall of the water-impervious member 16. For example, as shown in FIG. 12(A), the collar-shaped member 96 is formed in such a ring shape that an inner surface extends along the outer surface of the water-impervious member 16, by utilizing a vinyl sheet or the like, and is arranged in an upper portion of the side wall of the water-impervious member 16.

As mentioned above, the water content of the soil portion 26 is sucked up to the upper soil in accordance with the capillary phenomenon, permeates into the soil in the upper portion of the water-impervious member 16 and around the same, and forms the soil portion 30 in the capillary water state. In this case, if the collar-shaped member 96 is provided in the water-impervious member 16, the collar-shaped member 96 shuts off the permeation of the water to the soil below the same. Accordingly, the permeated water permeates in a horizontal direction. Accordingly, it is possible to form the soil portion 30 in the capillary water state expanding to a wide range in the horizontal direction. It is possible to form the soil portion 30 in the capillary water state expanding to the wide range more efficiently, by lowering an amount of the water permeating toward the lower side by using the collar-shaped member 96, as mentioned above, whereby it is possible to reduce the amount of the used water.

In this case, as long as the collar-shaped member 96 is provided in such a manner as to extend like a collar shape from a peripheral edge of the upper opening of the water-impervious member so as to shut off the permeation of the water into the soil below the same, any collar-shaped member may be employed, for example, it may be formed such that an outer peripheral portion is raised, as shown in FIG. 12(B). Further, for example, as shown in FIG. 12(C), the collar-shape member 96 may be formed into a funnel shape so as to be inserted to the upper opening of the water-impervious member 16. Further, each of the collar-shaped members 96 is provided in the upper portion of the side wall of the water-impervious member 16 in FIG. 12, however, the arranged position (depth) of the collar-shaped member 96 is not limited thereto, but the collar-shaped member 96 may be arranged in a middle portion of the side wall of the water-impervious member 16, or may be arranged in a lower portion of the side wall of the water-impervious member 16. Further, the collar-shaped member 96 may be formed, for example, into a dish shape, and may be arranged below the water-impervious member 16. It is possible to form the soil portion 30 in the capillary water state to a desired depth by adjusting the arranged position of the collar-shaped member 96. Further, the water-impervious member 16 and the collar-shaped member 96 may be integrally formed.

Further, in each of the embodiments mentioned above, the water-impervious member 16 is formed into the bottomed cylindrical shape, however, the shape of the water-impervious member 16 is not necessarily limited thereto. For example, as shown in FIGS. 13 to 18, the water-impervious member 16 may be formed into a horizontal pipe shape.

Figure 13:
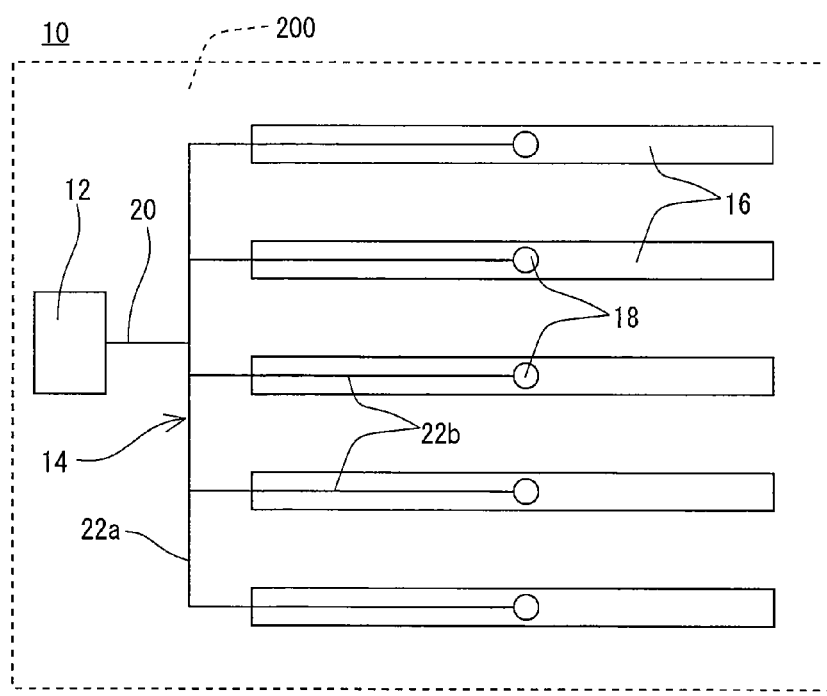
FIG. 13 is an illustrative diagram showing yet another embodiment of the subirrigation system in accordance with this invention.

For example, in an embodiment shown in FIG. 13, the water-impervious member 16 is formed into a horizontal pipe shape having an opening 98 in its upper surface, and the water-impervious members 16 extending to the vicinities of both ends of the cultivated land 200 are arranged in a dispersing manner so as to be lined up at a predetermined distance. The water-impervious member 16 is, for example, a half pipe having a semicircular shape in cross section, and as the half pipe, for example, it is possible to utilize structure obtained by cutting a general-purpose vinyl chloride pipe having an inner diameter of 100 mm into two sections along an axial direction. In this case, in place of forming one opening 98 extending all over a whole length of the water-impervious member 16, a plurality of openings 98 may be formed at predetermined distances.

As mentioned above, even if the water-impervious member 16 is formed into the horizontal pipe shape, it is possible to properly form the soil portion 30 in the capillary water state by properly controlling the water level 28 of the gravitational water in the inner portion with the water level controller 18. For example, it is preferably to individually control such that the water level 28 of the gravitational water within each of the water-impervious members 16 comes to the desired water level, by providing the water level controller 18 in the vicinity of the center of each of the water-impervious members 16 and feeding the water into the water-impervious member 16 from the second branch pipe 22b via the water level controller 18, in the same manner as the embodiment shown in FIG. 7.

If the water level 28 of the gravitational water within each of the water-impervious members 16 is individually controlled as mentioned above, it is also possible to preferably apply the system 10 to terraced fields or the like formed in the slope land. In this case, it is not exactly necessary to individually control the water level 28 of the gravitational water, but the water level 28 of the gravitational water in all the water-impervious members 16 may be collectively controlled by providing the water level controller 18 in the main pipe 20, or the water level 28 of the gravitational water may be controlled for each of a plurality of water-impervious members 16 by providing the water level controller 18 in the first branch pipe 22a, in the same manner as the embodiment shown in FIG. 1.

In this case, if the shape of the water-impervious member 16 is made too long in a horizontal direction, the water fed from the second branch pipe 22b does not permeate properly into the end portion within the water-impervious member 16, but flows over the upper portion thereof, and there is a possibility that it is impossible to properly form the soil portion 26 in the gravitational water state. Accordingly, in the case of using the horizontal pipe-shaped water-impervious member 16, it is preferable that a pipe member 100 is provided in the inner portion of the water-impervious member 16. The pipe member 100 is a pipe body provided in the inner portion of the water-impervious member 16 formed into the horizontal pipe shape, and extending in an axial direction in such a manner as to extend along the bottom surface of the water-impervious member 16, and serves as a feed water member for forming the water cannel 92 passing through the water-impervious member 16.

Figure 14:
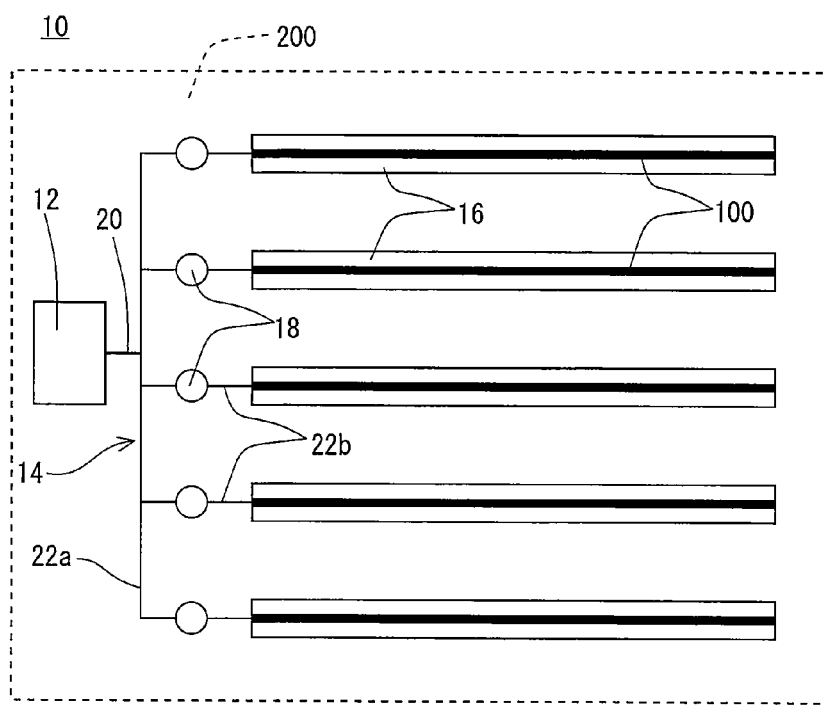
FIG. 14 is an illustrative diagram showing yet another embodiment of the subirrigation system in accordance with this invention.
Figure 15:
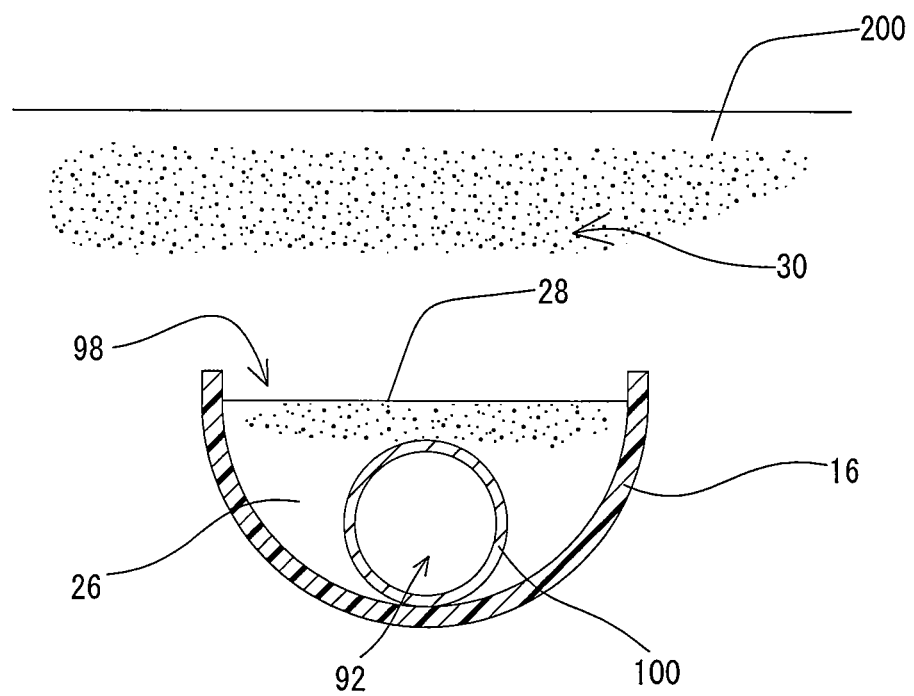
FIG. 15 is a schematic cross-sectional view showing an example of a condition around a water-impervious member of the subirrigation system in FIG. 14.

For example, in the embodiment shown in FIGS. 14 and 15, the pipe member 100 is provided as the feed water member in the inner portion of the water-impervious member 16. Many fine holes (not shown) are formed in a pipe wall of the pipe member 100, and the pipe member 100 is connected to the second branch pipe 22b in the inner portion of the water-impervious member 16, feeds the water delivered from the second branch pipe 22b to the inner side of the water-impervious member 16, and forms the soil portion 26 in the gravitational water state within the water-impervious member 16. By using the pipe member 100 mentioned above, it is possible to properly permeate the water into the end portion within the water-impervious member 16 formed into the horizontal pipe shape, making it possible to properly form the soil portion 26 in the gravitational water state within the water-impervious member 16.

Figure 16:
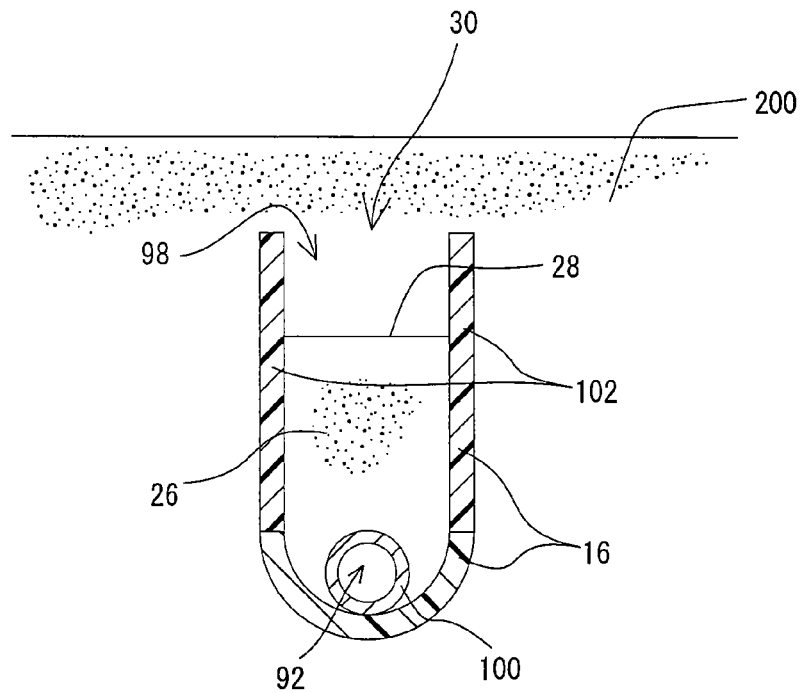
FIG. 16 is a schematic cross-sectional view showing another example of the condition around the water-impervious member of the subirrigation system in FIG. 14.

Further, as shown in FIG. 16, it is possible to employ structure obtained by connecting a rectangular side plate to both side edges in a peripheral direction of the half pipe in the embodiment shown in FIG. 15 in a vertical direction, and providing a rising portion 102 rising upward from the peripheral edge of the opening 98, as the water-impervious member 16.

Figure 17:
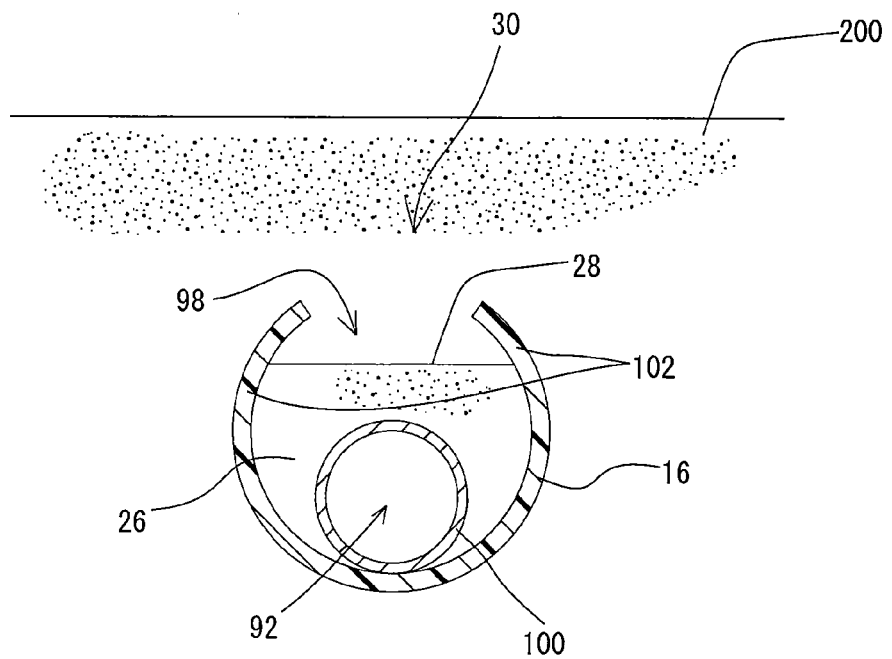
FIG. 17 is a schematic cross-sectional view showing still another example of the condition around the water-impervious member of the subirrigation system in FIG. 14.

Further, in place of connecting the rectangular side plate to both the side edges in the peripheral direction of the half pipe, both the side edges in the peripheral direction of the half pipe may be extended in the upper direction, as shown in FIG. 17. In this case, the pipe wall of the polyvinyl chloride pipe extended in the upper direction serves as the rising portion 102.

Figure 18:
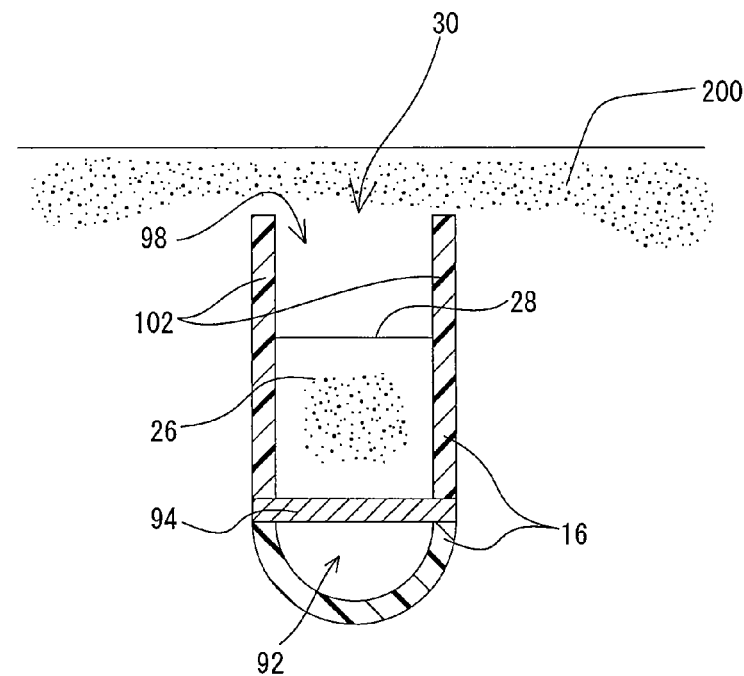
FIG. 18 is a schematic cross-sectional view showing yet another example of the condition around the water-impervious member of the subirrigation system in FIG. 14.

Further, in place of the pipe member 100 in the embodiment shown in FIG. 16, the water channel 92 may be formed in the bottom portion of the water-impervious member 16, by providing a rectangular perforated plate 94 in such a manner as to be sandwiched between the half pipe and the side plate (the rising portion 102), as shown in FIG. 18.

In this case, in order to maintain the water level 28 of the gravitational water above the perforated pipe 90, or maintain the distance between the upper end 16b of the water-impervious member 16 and the upper surface of the gravitational water equal to or more than a predetermined distance, it is necessary that the water-impervious member 16 has a certain height. In this case, if the water-impervious member 16 (see FIG. 15) formed only by the half pipe is used, there is an advantage that it is easy to manufacture the water-impervious member 16 itself, however, a width thereof becomes large. However, if the water-impervious member 16 having the rising portion 102 is used as in the embodiments shown in FIGS. 16 to 18, it is possible to secure a height thereof while suppressing a width thereof.

In this case, in each of the embodiments shown in FIGS. 13 to 18, both ends of the water-impervious member 16 formed into the horizontal pipe shape extend to the vicinity of both the ends of the cultivated land 200, however, it is not necessarily limited thereto.

Figure 19:
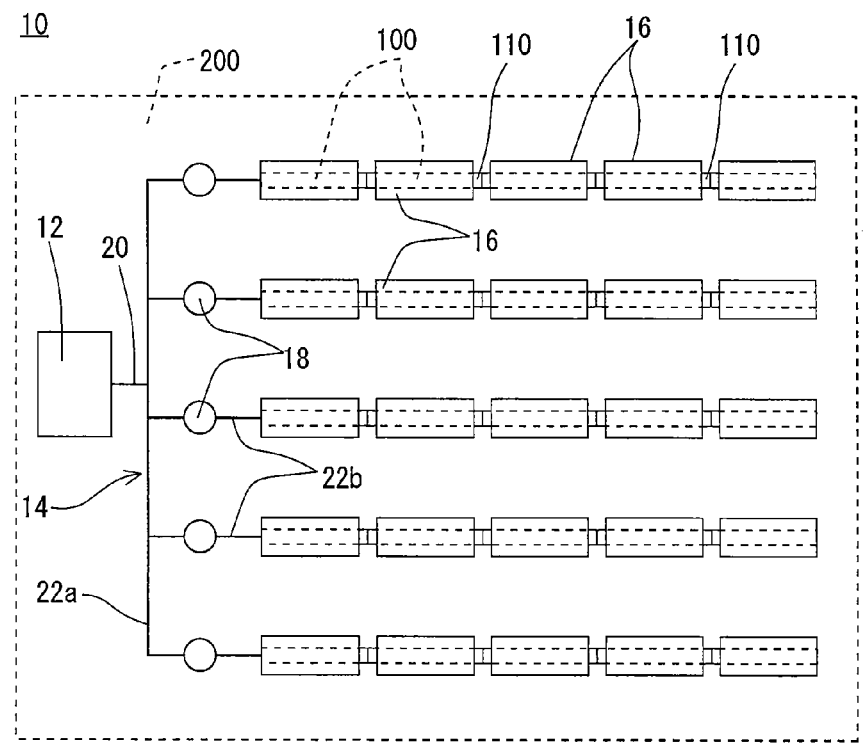
FIG. 19 is an illustrative diagram showing yet another example of the subirrigation system in accordance with this invention.

As shown in FIG. 19, a connection member 110 may be provided in the end portion of the water-impervious member 16, and the water-impervious member 16 and the other water-impervious member 16 are connected by this connection member 110 so as to be extended to the vicinity of both the ends of the cultivated land 200.

Figure 20:
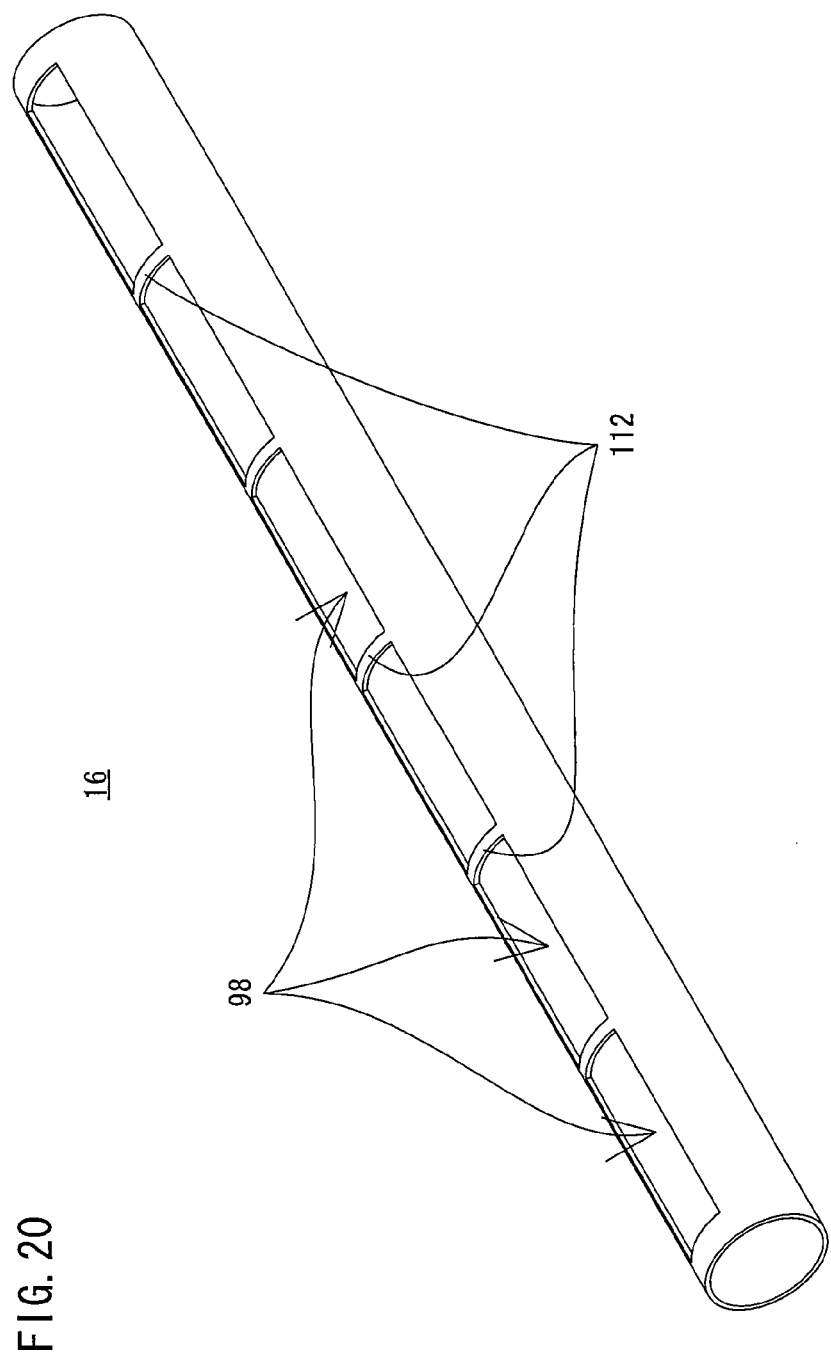
FIG. 20 is a schematic view showing an example of a water-impervious member used for the subirrigation system in FIG. 19.
Figure 21:
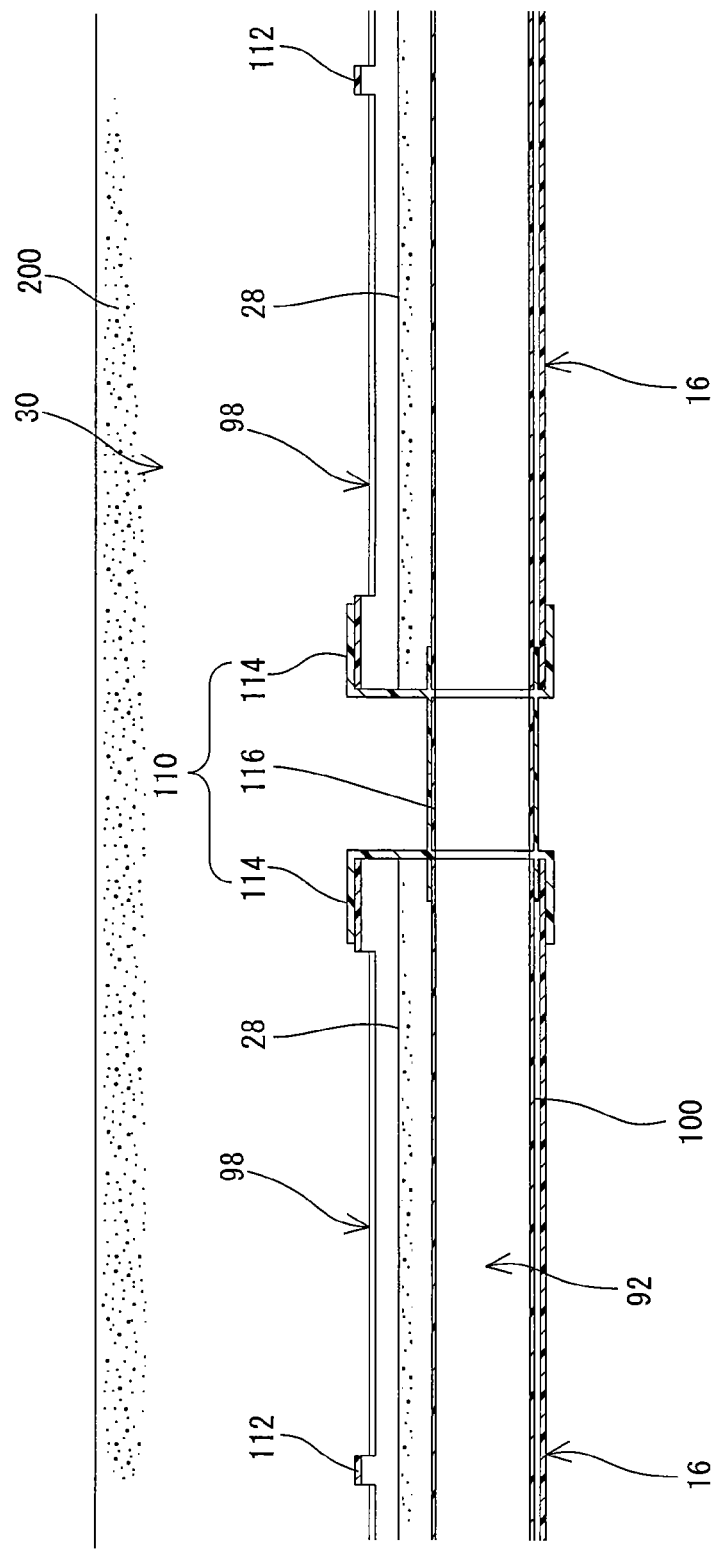
FIG. 21 is a schematic cross-sectional view showing an example of a condition around the water-impervious member of the subirrigation system in FIG. 19.

As the water-impervious member 16 in this case, for example, it is possible to utilize structure that a plurality of openings 98 are provided by cutting the pipe wall upper end portion of the general-purpose vinyl chloride pipe having the inner diameter of 100 mm at a predetermined distance in a pipe axial direction, as shown in FIGS. 20 and 21. A length in the axial direction of the water-impervious member 16 is, for example, 2000 mm. A portion except the opening 98 in the pipe wall upper end portion of the water-impervious member 16 serves as a reinforcing portion 112, and an edge of the opening 98 is reinforced by the reinforcing portion 112. In other words, the reinforcing portions 112 for reinforcing the edge of the opening 98 are provided at the predetermined distance in the pipe wall upper end portion of the water-impervious member 16.

Further, the pipe member 100 is provided as the feed water member in the inner portion of the water-impervious member 16. As the pipe member 100 in this case, for example, there is utilized structure obtained by forming many fine holes (not shown) only in a pipe wall lower end portion of the general-purpose vinyl chloride pipe, and the pipe member 100 feeds the water flowing through the water channel 92 via the fine holes mainly downward, and forms the soil portion 26 in the gravitational water state within the water-impervious member 16. An inner diameter of the pipe member 100 is, for example, 50 mm, and a length in an axial direction of the pipe member 100 is, for example, 2000 mm.

As shown in FIG. 21, the connection member 110 is provided in the end portion of the water-impervious member 16. The connection member 110 is provided with two sockets 114 each having an identical shape, and one relay pipe 116.

Figure 22:
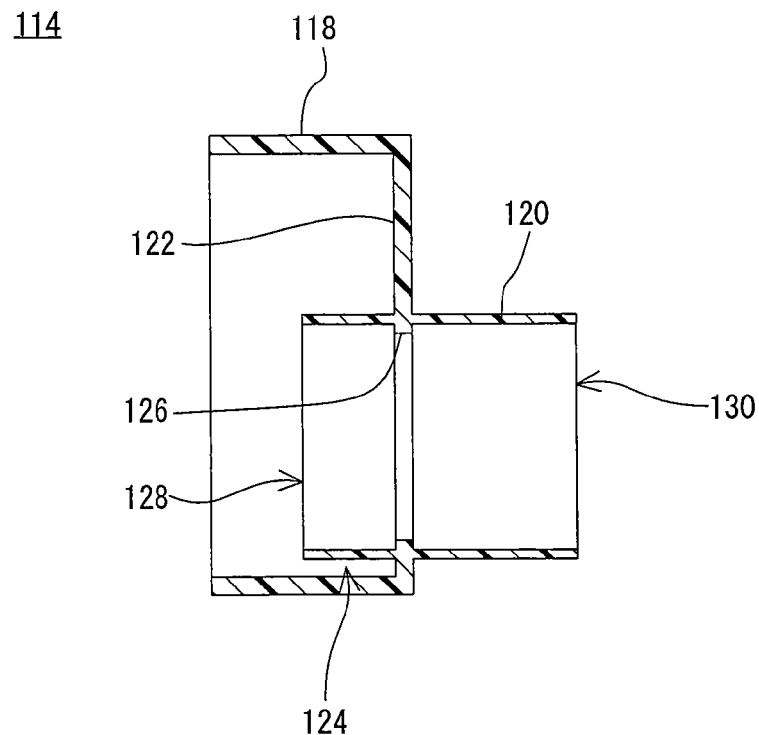
FIG. 22 is a cross-sectional view showing an example of a connection member used for the subirrigation system in FIG. 19.
Figure 23:
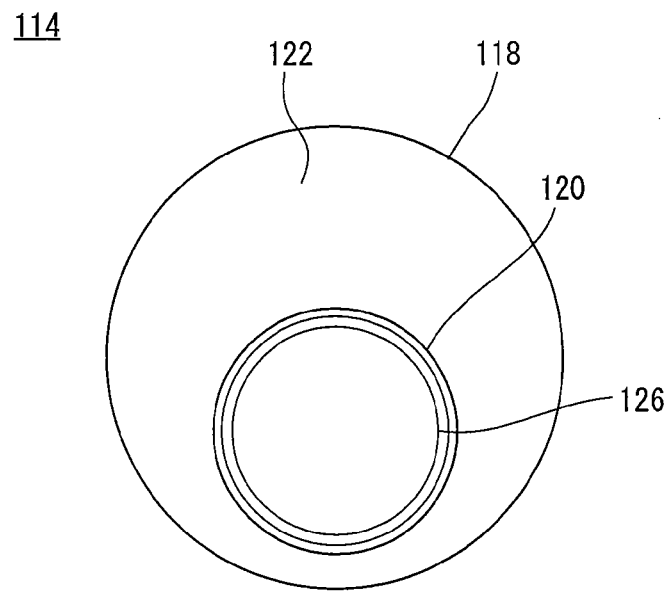
FIG. 23 is a plan view showing the connection member in FIG. 22.

As shown in FIGS. 21 to 23, the socket 114 includes an outer tube portion 118 and an inner tube portion 120, receives the end portion of the water-impervious member 16 by the outer tube portion 118, and receives the end portion of the pipe member 100 by the inner tube portion 120. In other words, a position of the pipe member 100 in the inner portion of the water-impervious member 16 is fixedly held by the connection member 110.

The outer tube portion 118 is formed into a cylindrical shape that one opening thereof is sealed by an outer tube stopper 122, and an inner diameter thereof is appropriately set in correspondence to an outer diameter of the water-impervious member 16, and is, for example, 115 mm.

The inner tube portion 120 is formed into a cylindrical shape passing through the outer tube stopper 122, and an inner diameter thereof is appropriately set in correspondence to the outer diameter of the pipe member 100, and is, for example, 60 mm. For example, a gap 124 that is equal to or somewhat larger than a thickness of the pipe wall of the water-impervious member 16 is formed between an outer peripheral surface of a peripheral wall lower end portion of the inner tube portion 120 and an inner peripheral surface of a peripheral wall lower end portion of the outer tube portion 118, and an end portion of the water-impervious member 16 is inserted to the gap 124. Further, an inner tube stopper 126 having an approximately equal width to the outer tube stopper 122 is formed on the same plane as the outer tube stopper 122, in the inner peripheral surface of the inner tube portion 120, and the inner tube portion 120 is partitioned into a first opening 128 that is open in an opening surface side of the outer tube portion 118, and a second opening 130 that is open in the outer tube stopper 122 side of the outer tube portion 118, with this inner tube stopper 126.

The relay pipe 116 has an approximately equal diameter to the pipe member 100, and connects the sockets 114 by being inserted to the second opening 130 of the inner tube portion 120.

A description will be made of one example of a method of elongating the water-impervious member 16 to the vicinity of both the ends of the cultivated land 200, by using the connection member 110 mentioned above.

First, the pipe member 100 is provided in the inner portion of the water-impervious member 16, thereby constructing a double-pipe unit that the connection member 110 is installed to each of the end portions of the water-impervious member 16 and the pipe member 100. Specifically, the end portion of the water-impervious member 16 is inserted to the outer tube portion 118 of the socket 114, and is pushed until it is locked by the outer tube stopper 122, and the end portion of the pipe member 100 within the water-impervious member 16 is inserted to the first opening 128 in the inner tube portion 120 of the socket 114, and is pushed until it is locked to the inner tube stopper 126.

Figure 24:
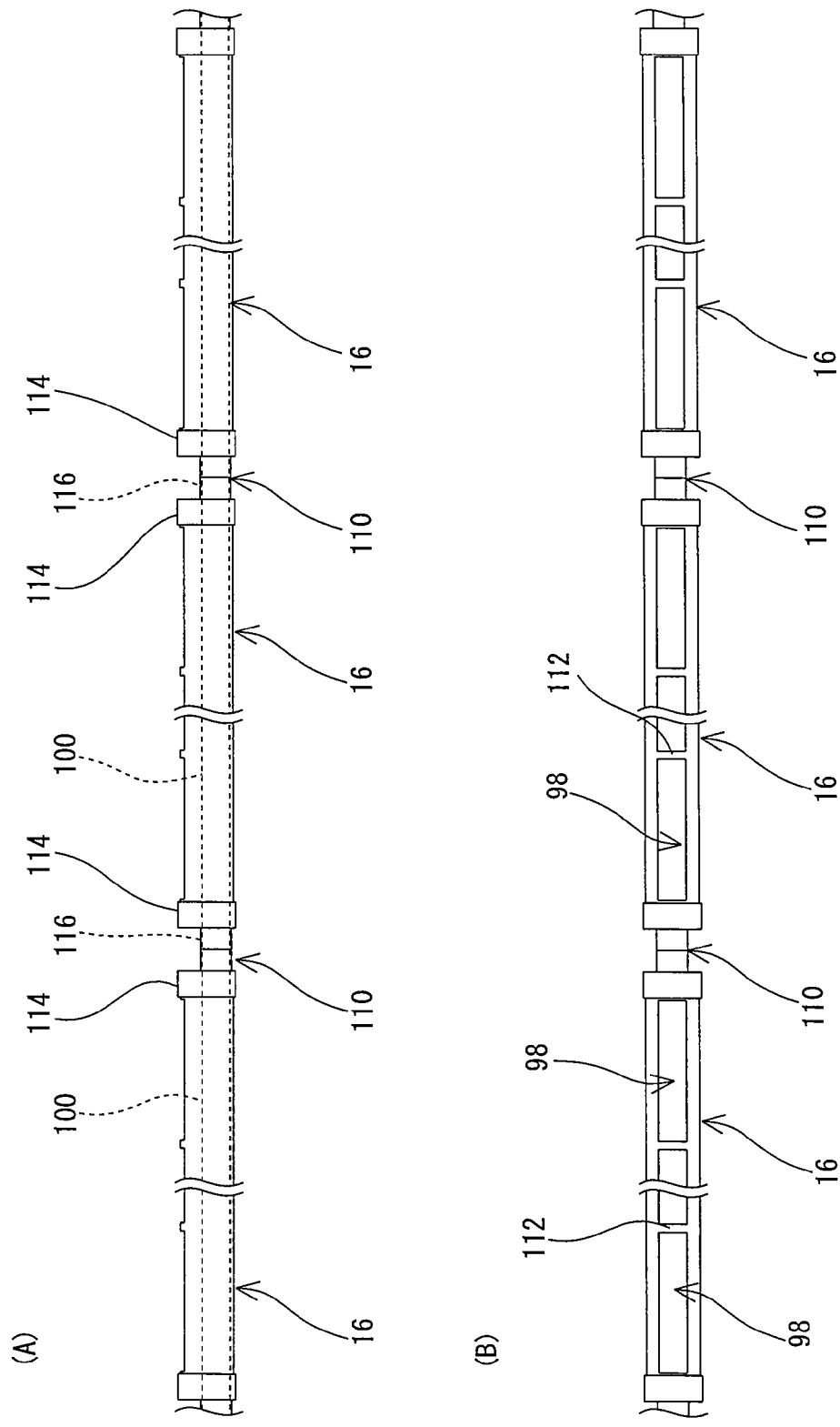
FIG. 24 is an illustrative diagram showing a condition that a water-impervious member is connected by the connection member in FIG. 22.

Next, as shown in FIG. 24, the double-pipe unit is continuously provided in the ground of the cultivated land 200 in such a manner as to extend to the vicinity of both the ends of the cultivated land 200. Specifically, the relay pipe 116 is inserted in such a manner as to overstride the second opening 130 in the inner tube portion 120 of the socket 114 provided in the end portion of the water-impervious member 16, and the second opening 130 in the inner tube portion 120 of the socket 114 installed to the end portion of the other water-impervious member 16, and is pushed until it is locked to the inner tube stopper 126. Further, this is repeated until the water-impervious member 16 extends to the vicinity of both the ends of the cultivated land 200.

In this embodiment, the connection member 110 is provided in the end portion of the water-impervious member 16, and the water-impervious member 16 and the pipe member 100 (the feed water member) provided in the inner portion thereof are appropriately connected by the connection member 110. Accordingly, even in the water-impervious member 16 having a small length, it is possible to extend to the vicinity of both the ends of the cultivated land 200 in correspondence to the shape and the range of the cultivated land 200. Accordingly, in comparison with the case that the water-impervious member 16 having a large length is moved to the working field, it becomes easy to move the water-impervious member 16 to the working field, and an excellent working property is obtained.

Further, in this embodiment, as the pipe member 100, there is utilized a synthetic resin pipe that many fine holes are formed only in the lower end portion of the pipe wall, and the pipe member 100 feeds the water in the water channel 92 mainly to the lower side. Accordingly, even if the root of the plant extends toward the feed water source, the root does not intrude and close the fine hole formed in the pipe wall lower end portion of the pipe member 100. Further, since the position of the pipe member 100 in the inner portion of the water-impervious member 16 is fixedly held by the connection member 110, it is possible to properly feed the water in the water channel 92 into the water-impervious member 16 by forming a space between the fine hole of the pipe wall lower end portion of the pipe member 100 and the inner peripheral surface of the pipe bottom of the water-impervious member 16.

Further, in this embodiment, the water-impervious member 16 is provided with the reinforcing portion 112 for reinforcing the opening 98 at the predetermined distance. For example, in the case that the opening 98 is provided over a whole length of the pipe wall upper end portion of the water-impervious member 16, there is thought that the water-impervious member 16 is deformed by a soil pressure from the circumference and its own stress, and the opening 98 is closed. However, the water-impervious member 16 can maintain its shape by providing the reinforcing portions 112 for reinforcing the opening 98 at the predetermined distance, as in this embodiment. Accordingly, it is possible to properly form the soil portion 26 in the gravitational water state within the water-impervious member 16.

Further, in this embodiment, it is possible to utilize a cylindrical pipe having both end openings, that is, a general-purpose synthetic resin pipe, for the water-impervious member 16 and the pipe member 100. It is possible to reduce a kind of the products and an amount of stock, and it is possible to make a production efficient, by applying a general-purpose property to the water-impervious member 16 and the pipe member 100, as mentioned above and an excellent economical efficiency is obtained.

Figure 25:
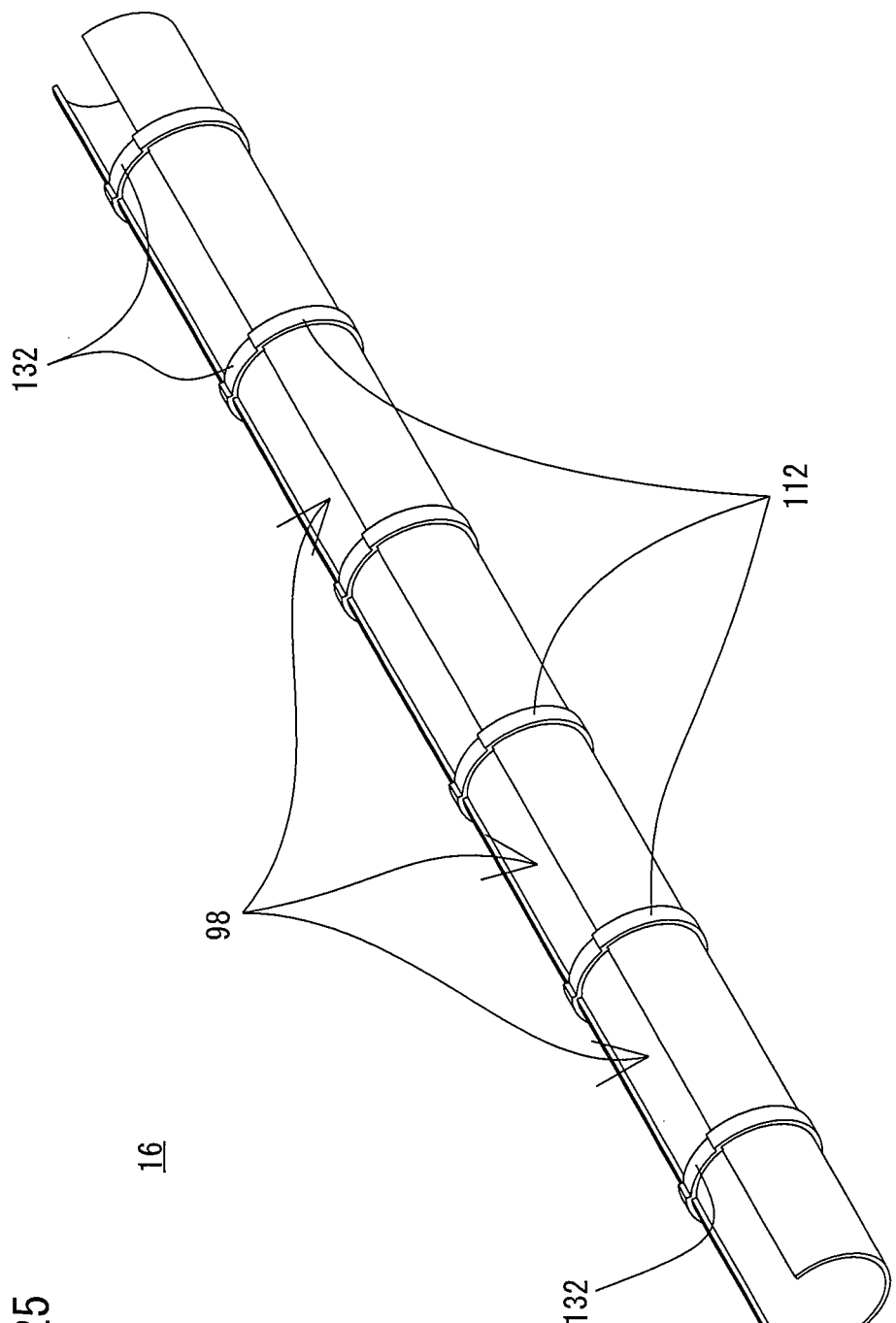
FIG. 25 is a perspective view showing another example of the water-impervious member used for the subirrigation system in FIG. 19.
Figure 26:
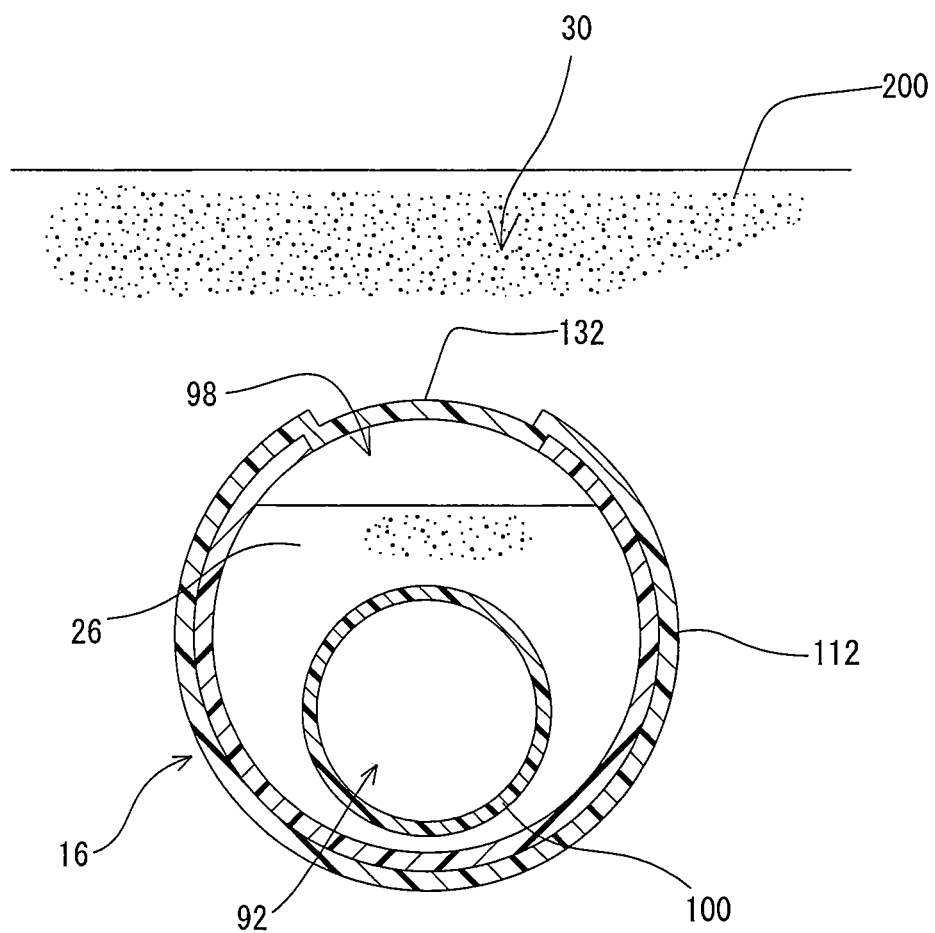
FIG. 26 is a schematic cross-sectional view showing another example of the condition around the water-impervious member of the subirrigation system in FIG. 19.

In this case, in the embodiment mentioned above, the pipe wall upper end portion of the synthetic resin pipe is cut at the predetermined distance, and the portion except the opening 98 is served as the reinforcing portion 112, however, it is not necessarily limited thereto. For example, as shown in FIGS. 25 and 26, the opening 98 may be provided over a whole length in the pipe axial direction in the pipe wall upper end portion of the synthetic resin pipe, and the reinforcing portion 112 constructed by an additional member may be installed to the synthetic resin pipe. The reinforcing portion 112 in this case is formed in an approximately short cylinder having a recess 132 in a part of the peripheral wall, and the shape of the water-impervious member 16 is maintained by fitting the recess 132 to the opening 98.

Further, in the embodiment mentioned above, the outer tube stopper 122 of the outer tube portion 118 in the socket 114 and the inner tube stopper 126 of the inner tube portion 120 are formed on the same plane, however, it is not necessarily limited thereto.

Figure 27:
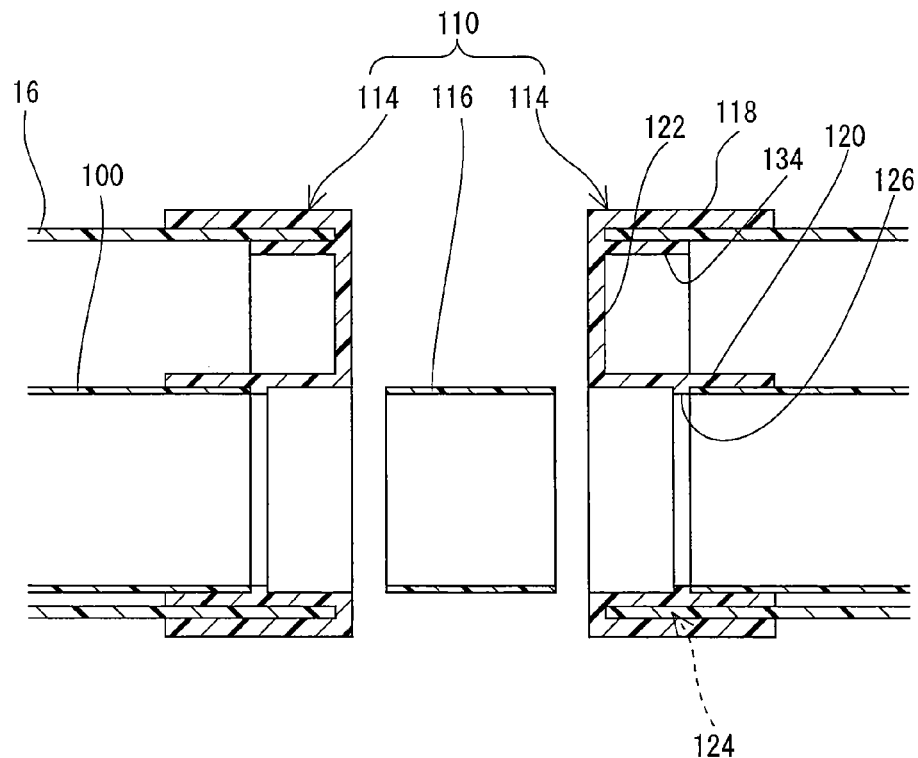
FIG. 27 is an illustrative diagram showing another example of the connection member used for the subirrigation system in FIG. 19.
Figure 28:
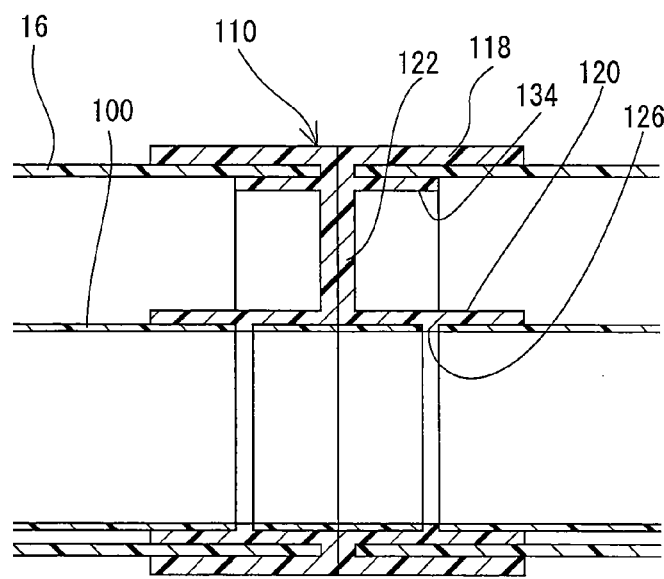
FIG. 28 is a cross-sectional view showing a condition that the water-impervious member is connected by the connection member in FIG. 27.

For example, in the socket 114 shown in FIGS. 27 and 28, the outer tube stopper 122 of the outer tube portion 118 and the opening surface of the second opening 130 in the inner tube portion 120 are formed on the same plane, and the inner tube stopper 126 is arranged within a range between the opening surface in the outer tube portion 118 and the outer tube stopper 122. Further, a restraint portion 134 extending in an axial direction of the outer tube portion 118 is formed in the outer tube stopper 122. The restraint portion 134 is arranged, for example, so as to be spaced at such a gap that is equal or somewhat larger than the thickness of the pipe wall of the water-impervious member 16 with respect to the inner peripheral surface of the peripheral wall upper end portion of the outer tube portion 118, and the end portion of the water-impervious member 16 is inserted in the gap. In other words, the end portion of the water-impervious member 16 is inserted in the gap between the inner peripheral surface of the outer tube portion 118 and the restraint portion 134, as well as the gap 124 between the inner peripheral surface of the outer tube portion 118 and the outer peripheral surface of the inner tube portion 120.

In this case, if an amount of insertion of the pipe member 100 to the inner tube portion 120 comes short, there is a risk that the water channel 92 is not properly formed. Accordingly, it is necessary to push the pipe member 100 to the inner tube portion 120 until the end portion of the pipe member 100 is securely locked to the inner tube stopper 126. For example, in the case that the outer tube stopper 122 and the inner tube stopper 126 in the socket 114 are formed on the same plane, it is necessary to adjust the length of the water-impervious member 16 and the length of the pipe member 100 so as to be approximately equal. On the contrary, in the socket 114 shown in FIGS. 27 and 28, the inner tube stopper 126 in the inner tube portion 120 is arranged within the range between the opening surface of the outer tube portion 118 and the outer tube stopper 122, and the end portion of the water-impervious member 16 can be inserted in the gap 124 between the inner peripheral surface of the outer tube portion 118 and the outer peripheral surface of the inner tube portion 120, and the gap between the inner peripheral surface of the outer tube portion 118 and the restraint portion 134. Accordingly, an allowable range of the amount of insertion of the water-impervious member 16 to the outer tube portion 118 of the socket 114 is expanded, and if the pipe member 100 can be pushed to the inner tube portion 120 until at least the end portion of the pipe member 100 is securely locked to the inner tube stopper 126, the length of the water-impervious member 16 may be larger or smaller in any one than in the other as long as it is not different very much from the length of the pipe member 100. Accordingly, it is not necessary to adjust the length of the water-impervious member 16 in detail.

Further, in the embodiment mentioned above, the water-impervious member 16 is connected to the other water-impervious member 16 by the connection member 110 provided with two sockets 114 each having the identical shape and one relay pipe 116, however, it is not necessarily limited thereto.

Figure 29:
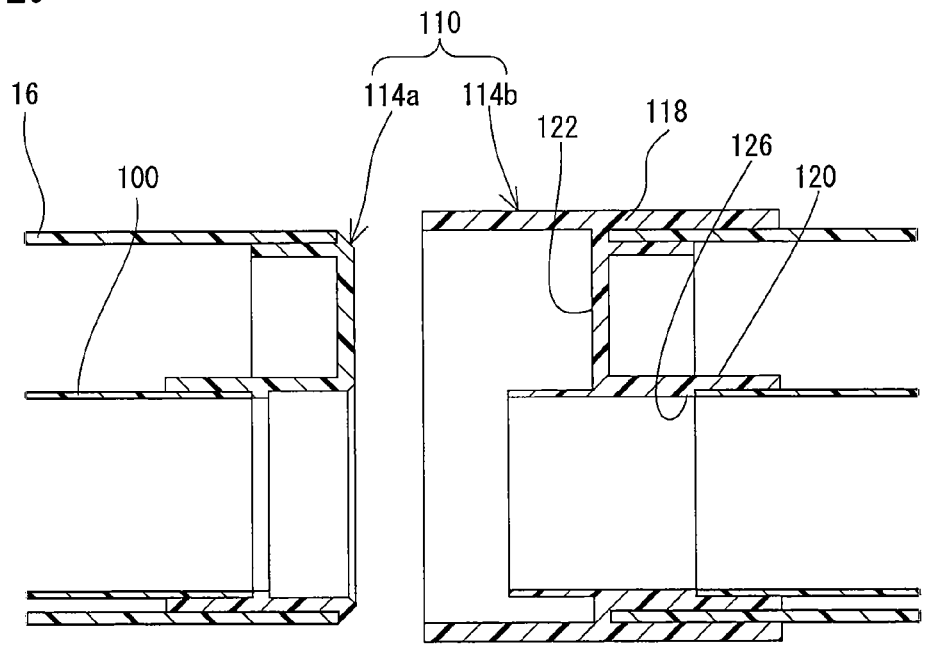
FIG. 29 is an illustrative diagram showing still another example of the connection member used for the subirrigation system in FIG. 19.
Figure 30:
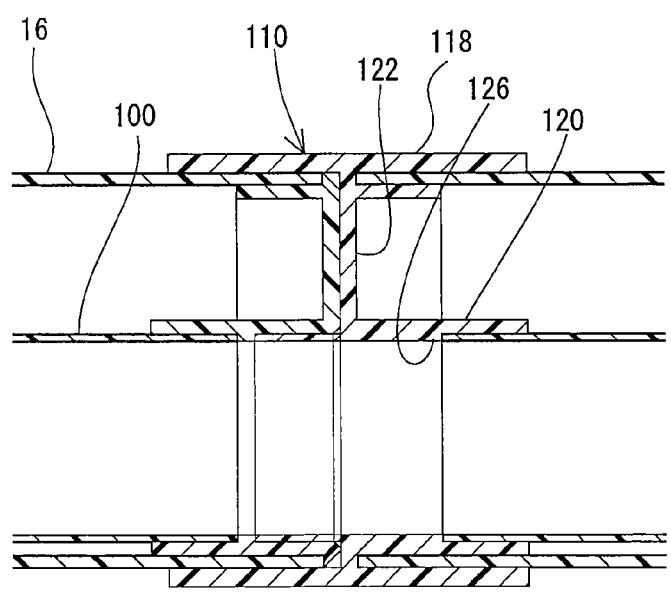
FIG. 30 is a cross-sectional view showing a condition the water-impervious member is connected by the connection member in FIG. 29.

For example, a connection member 110 shown in FIGS. 29 and 30 is constructed by a first socket 114a and a second socket 114b having different shapes, and it is possible to connect each of the water-impervious member 116 and the pipe member 100 without using the relay pipe 116. As shown in FIG. 29, the first socket 114a has such a shape that the outer tube portion 118 in the socket 114 shown in FIG. 27 is excluded. The second socket 114b has such a shape that the outer tube portion 118 excluded from the first socket 114a is integrally formed in the outer tube portion 118 of the socket 114 shown in FIG. 27, and the relay tube 116 is integrally formed in the inner tube portion 120. In accordance with the connection member 110 mentioned above, each of the water-impervious members 16 and the pipe members 100 is connected by fitting the first socket 114a installed to the end portion of the water-impervious member 16, and the second socket 114b installed to the end portion of the other water-impervious member 16, as shown in FIG. 30.

Figure 31:
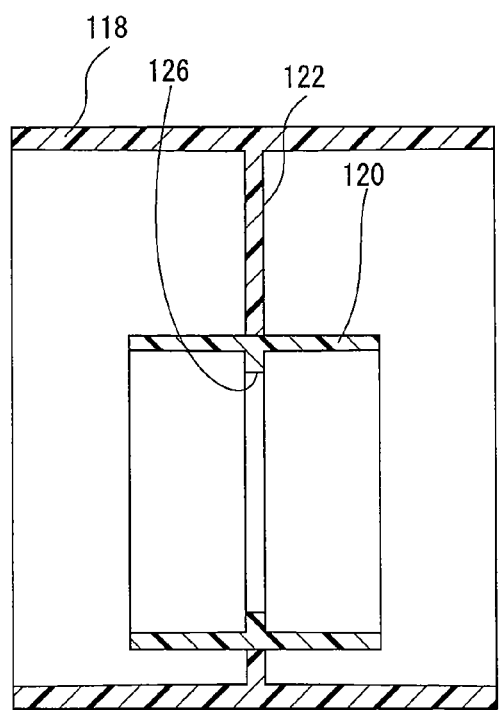
FIG. 31 is a cross-sectional view showing yet another example of the connection member used for the subirrigation system in FIG. 19.
Figure 32:
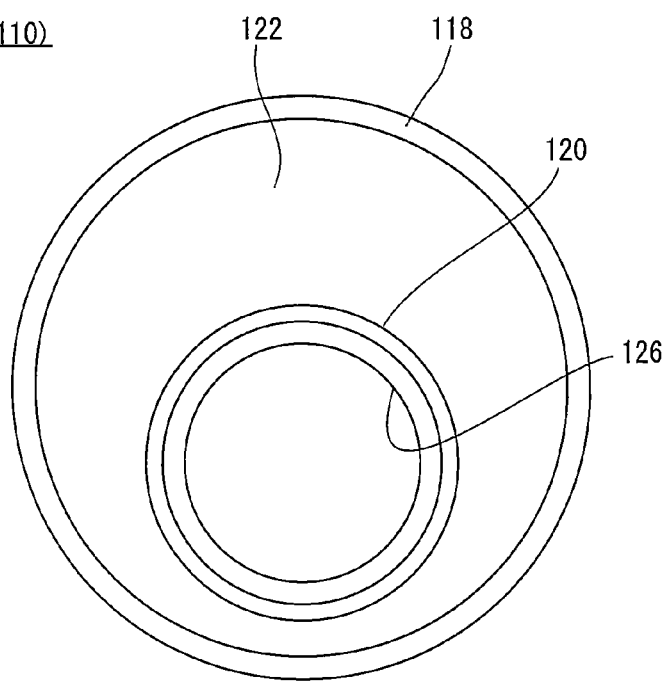
FIG. 32 is a plan view showing the connection member in FIG. 31.

Further, for example, a connection member shown in FIGS. 31 and 32 is constructed by one socket 114, and it is possible to connect each of the water-impervious member 16 and the pipe member 100 by this one socket 114. The socket 114 in this case includes the outer tube portion 118 and the inner tube portion 120, as shown in FIGS. 31 and 32, receives the end portion of the water-impervious member 16 by the outer tube portion 118, and receives the end portion of the pipe member 100 by the inner tube portion 120. The outer tube portion 118 is formed into such a cylindrical shape that an intermediate in an axial direction thereof is closed by the outer tube stopper 122, and for example, a length in an axial direction thereof is 100 mm, and an inner diameter thereof is appropriately set in correspondence to the outer diameter of the water-impervious member 16, and is, for example, 115 mm. The inner tube portion 120 is formed into such a cylindrical shape as to pass through the outer tube stopper 122 in the outer tube portion 118, a length in an axial direction thereof is 50 mm, and an inner diameter thereof is appropriately set in correspondence to the outer diameter of the pipe member 100, and is, for example, 60 mm. An inner tube stopper 126 protruding toward a center direction of the inner tube portion 120 is formed on the same plane as the outer tube stopper 122, in the inner peripheral surface of the inner tube portion 120.

Figure 33:
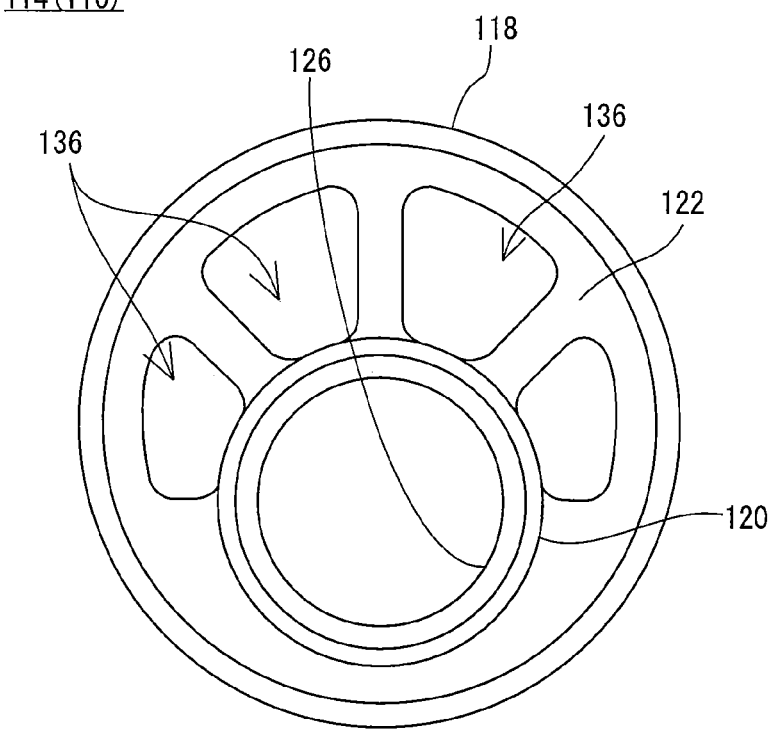
FIG. 33 is a plan view showing yet another example of the connection member used for the subirrigation system in FIG. 19.

In this case, as shown in FIG. 33, it is also possible to form a communication portion 136 communicating one opening of the outer tube portion 118 with the other opening in the outer tube stopper 122 in the socket 114. In this case, the water in the inner portion of the water-impervious member 16 can move between the adjacent water-impervious members 16 connected by the socket 114 (the connection member 110) via the communication portion 136.

Figure 34:
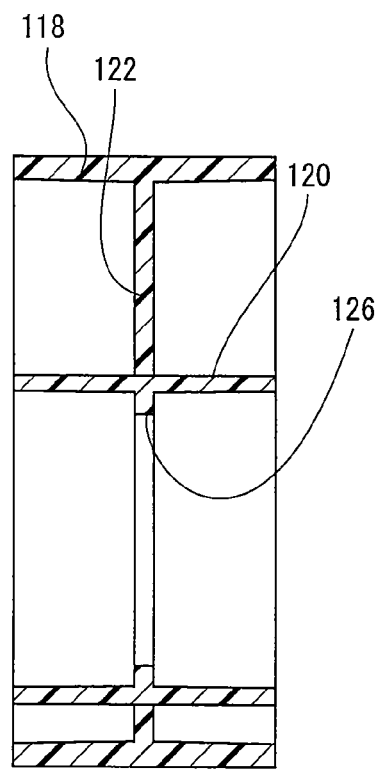
FIG. 34 is a cross-sectional view showing yet another example of the connection member used for the subirrigation system in FIG. 19.

Further, as shown in FIG. 34, it is possible to equally form so as to parallelize the length in the axial direction of the outer tube portion 118 of the socket 114 with the length in the axial direction of the inner tube portion 120.

Figure 35:
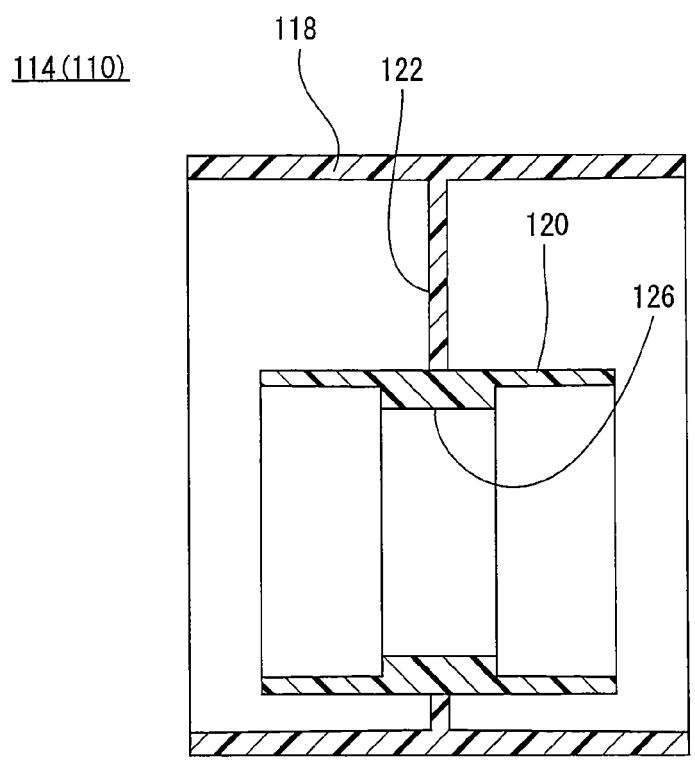
FIG. 35 is a cross-sectional view showing yet another example of the connection member used for the subirrigation system in FIG. 19.

In this case, in the socket 114 shown in FIGS. 31 to 34, the outer tube stopper 122 of the outer tube portion 118 and the inner tube stopper 126 of the inner tube portion 120 are formed by an approximately equal width on the same plane, however, it is not necessarily limited thereto. For example, as shown in FIG. 35, it is possible to arrange the position locking the end portion of the pipe member 100 in the inner tube stopper 126 within the range between the opening surface of the outer tube portion 118 and the outer tube stopper 122, by forming the inner tube stopper 126 of the inner tube portion 120 long in the axial direction. Even in this case, it is not necessary to adjust in detail the length of the water-impervious member 16, as mentioned above, and an excellent workability is obtained.

Figure 36:
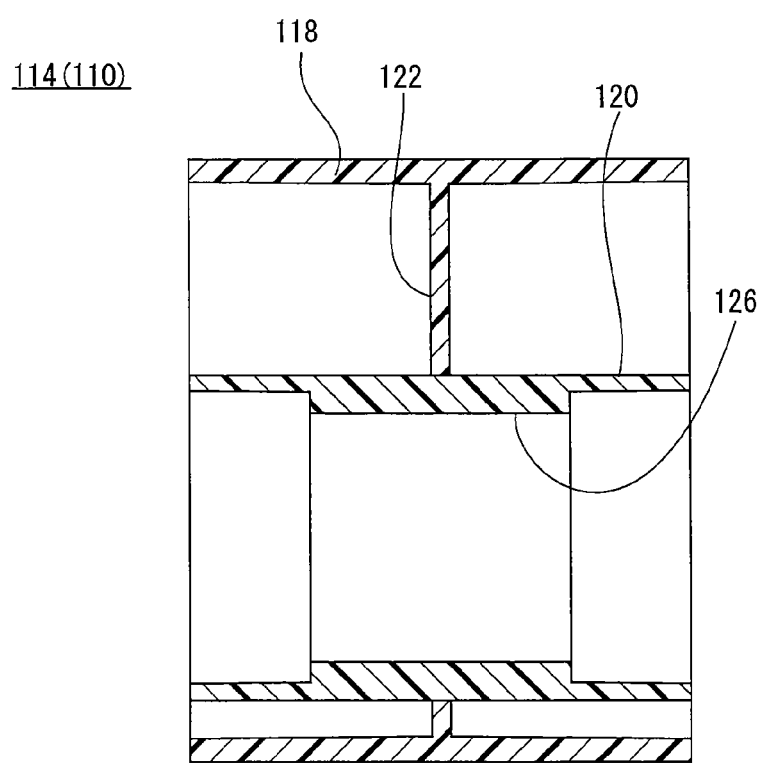
FIG. 36 is a cross-sectional view showing yet another example of the connection member used for the subirrigation system in FIG. 19.

As shown in FIG. 36, the same thing also applies to the case of the socket 114 that the length in the axial direction of the outer tube portion 118 and the length in the axial direction of the inner tube portion 120 are formed equal.

In this case, in any of the embodiments shown in FIGS. 19 to 36, the inner portion of the water-impervious member 16 is provided with the synthetic resin pipe that many fine holes are formed only in the pipe wall lower end portion, as the pipe member 100, however, it is not necessarily limited thereto. For example, a water conducting portion 138 may be integrally formed in the inner portion of the water-impervious member 16, and the water conducting portion 138 can be used as the pipe member 100.

Figure 37:
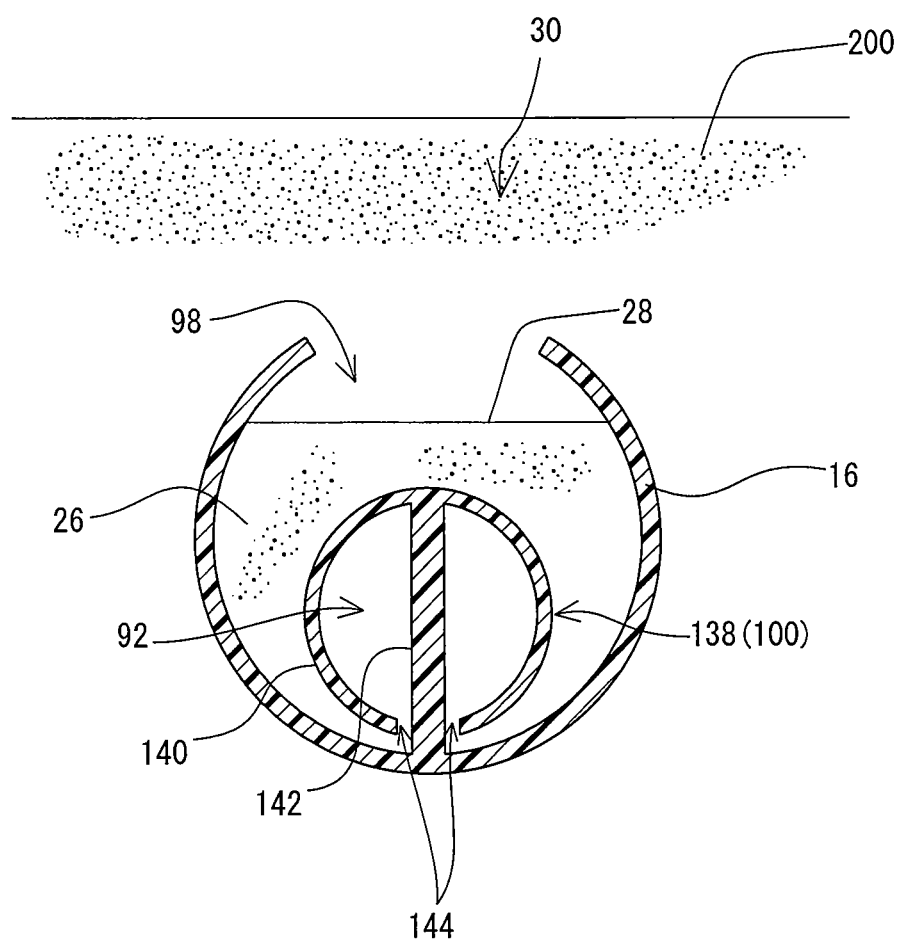
FIG. 37 is a schematic cross-sectional view showing still another example of the condition around the water-impervious member of the subirrigation system in FIG. 19.

As shown in FIG. 37, the water conducting portion 138 is provided with a tubular portion 140 forming a water channel 92 in an inner portion thereof, and a support portion 142 fixing the tubular portion 140 and the water-impervious member 16. The tubular portion 140 is formed into an approximately cylindrical shape having a gap 144 in a lower end portion of a peripheral wall, and the water in the water channel 92 is fed to a lower side via the gap 144. The support portion 142 is formed into a plate shape protruding in a vertically upward direction from a lower end portion in an inner peripheral surface of the water-impervious member 16, and is connected to an inner peripheral surface of the tubular portion 140 through the gap 144. The support portion 142 fixes a position of the tubular portion 140 within the water-impervious member 16.

In this embodiment, the water-impervious member 16 and the water conducting portion 138 (the pipe member 100) are integrally formed. Accordingly, it is possible to achieve a reduction of a piping work in the subirrigation system 10 and further an improvement of the workability.

Figure 38:
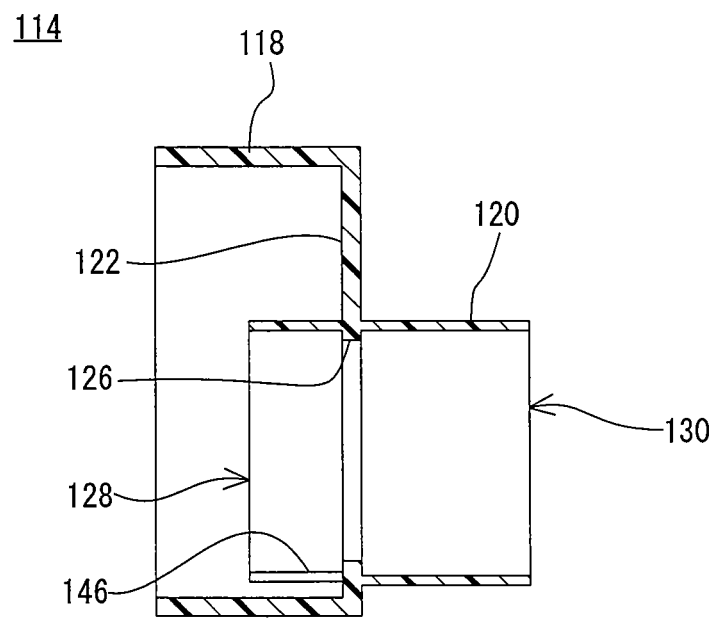
FIG. 38 is a cross-sectional view showing an example of a connection member used for the water-impervious member in FIG. 37.
Figure 39:
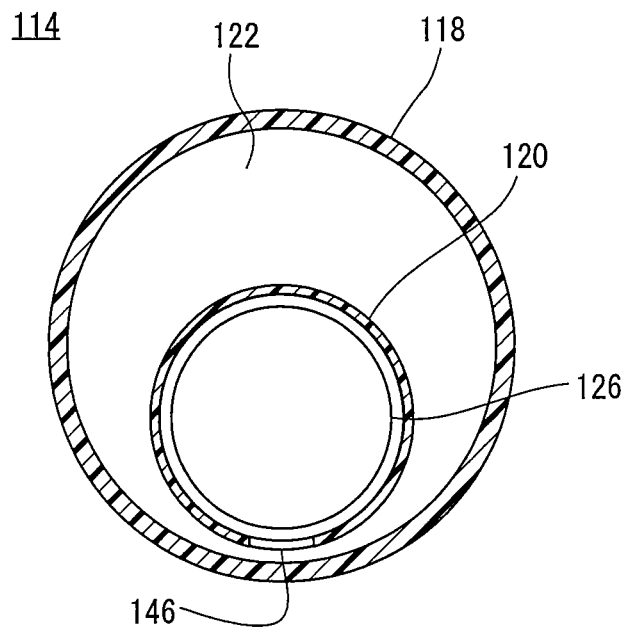
FIG. 39 is a cross-sectional view showing an example of a connection member used for the water-impervious member in FIG. 37.

In this case, in the case that the connection member 110 is provided in the end portion of the water-impervious member 16, it is preferable to form a notch portion 146 in a lower end portion in the first opening 128 side in the inner tube portion 120 of the socket 114 so as to insert the support portion 142 to the notch portion 146, as shown in FIGS. 38 and 39.

Figure 40:
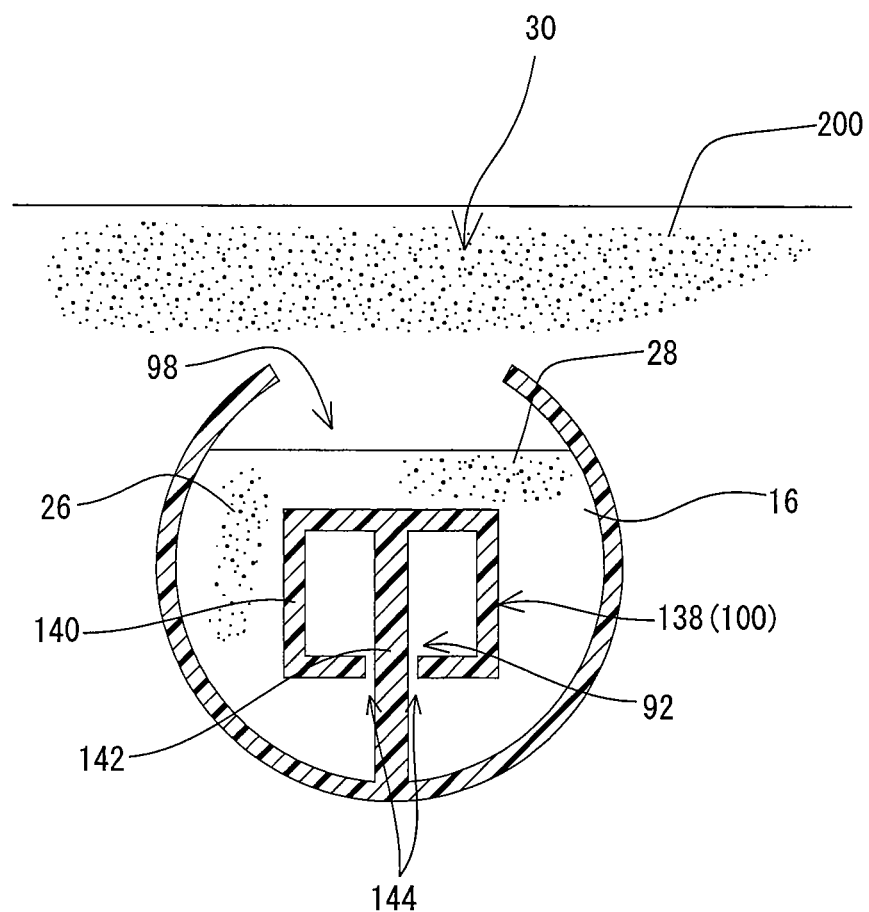
FIG. 40 is a schematic cross-sectional view showing yet another example of the condition around the water-impervious member of the subirrigation system in FIG. 19.

Further, in the embodiment shown in FIG. 37, the tubular portion 140 is formed into the approximately cylindrical shape having the gap 144 in the lower end portion of the peripheral wall, however, it is not necessarily limited to this. For example, as shown in FIG. 40, it is possible to form the tubular portion 140 in the water conducting portion 138 as an approximately rectangular shape having the gap 144 in the lower end portion of the peripheral wall.

Figure 41:
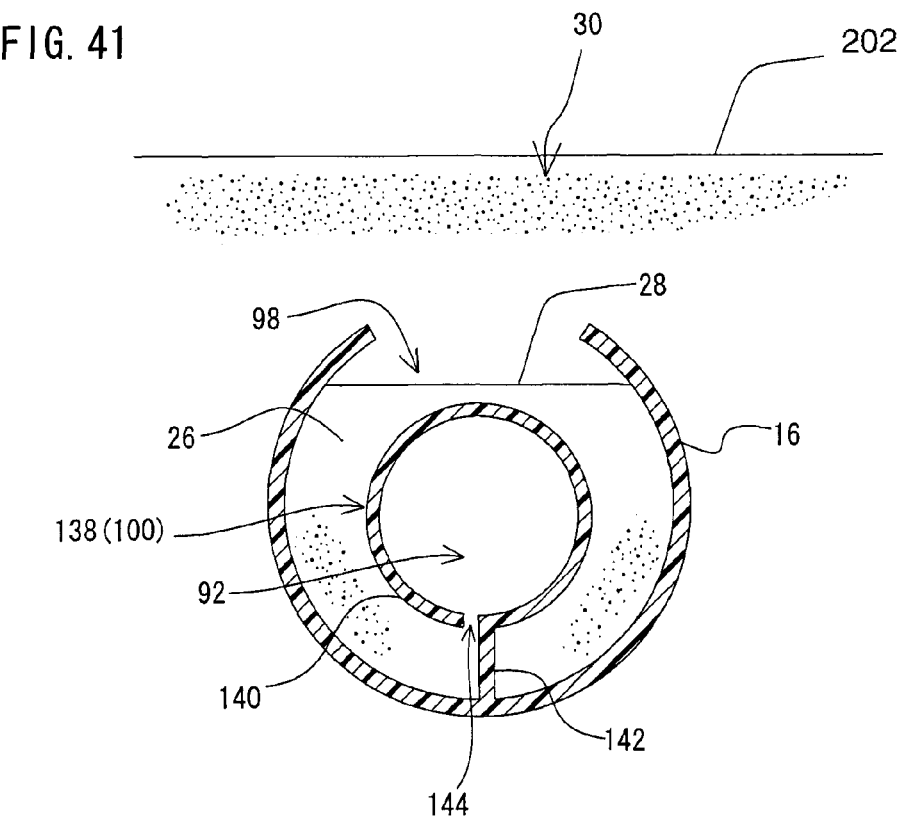
FIG. 41 is a schematic cross-sectional view showing yet another example of the condition around the water-impervious member of the subirrigation system in FIG. 19.

Further, in the embodiment shown in FIG. 37, the support portion 142 is connected to the inner peripheral surface of the tubular portion 140 through the gap 144, however, it is not necessarily limited to this. For example, as shown in FIG. 41, it is possible to form a water conducting portion 138 formed into a so-called question mark shape in the inner portion of the water-impervious member 16, by connecting the support portion 142 to a peripheral edge portion of the gap 144 in the tubular portion 140.

Figure 42:
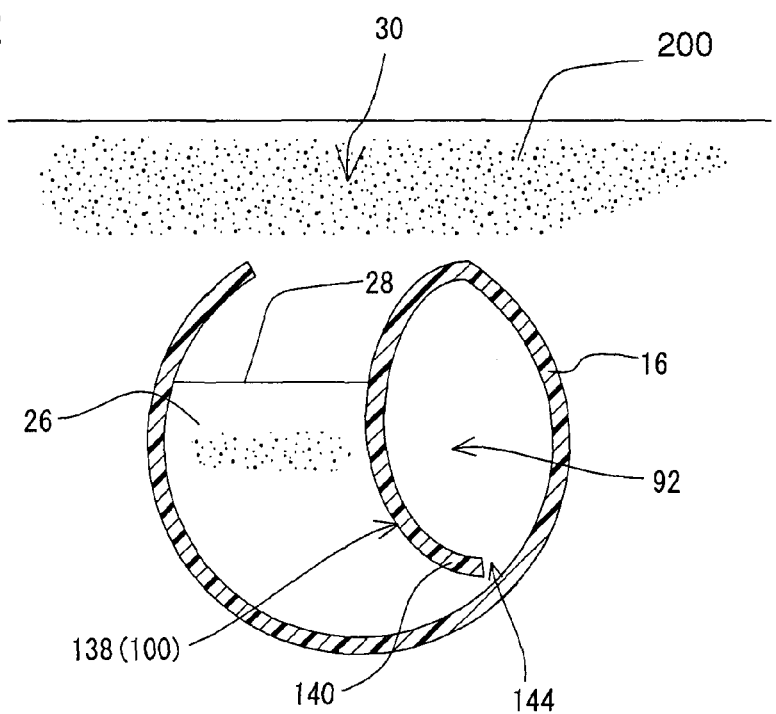
FIG. 42 is a schematic cross-sectional view showing yet another example of the condition around the water-impervious member of the subirrigation system in FIG. 19.

Further, as shown in FIG. 42, it is possible to form, in the inner portion of the water-impervious member 16, a water conducting portion 138 forming the gap 144 between an opening edge of the water-impervious member 16 and an inner peripheral surface thereof, by folding an opening edge in the pipe wall upper end portion of the water-impervious member 16 inward.

Further, in the embodiment mentioned above, the tubular portion 140 and the support portion 142 are integrally formed, however, it is not necessarily limited to this, but the water conducting portion 138 may be constructed by forming the tubular portion 140 and the support portion 142 as independent bodies, and combining them.

Figure 43:
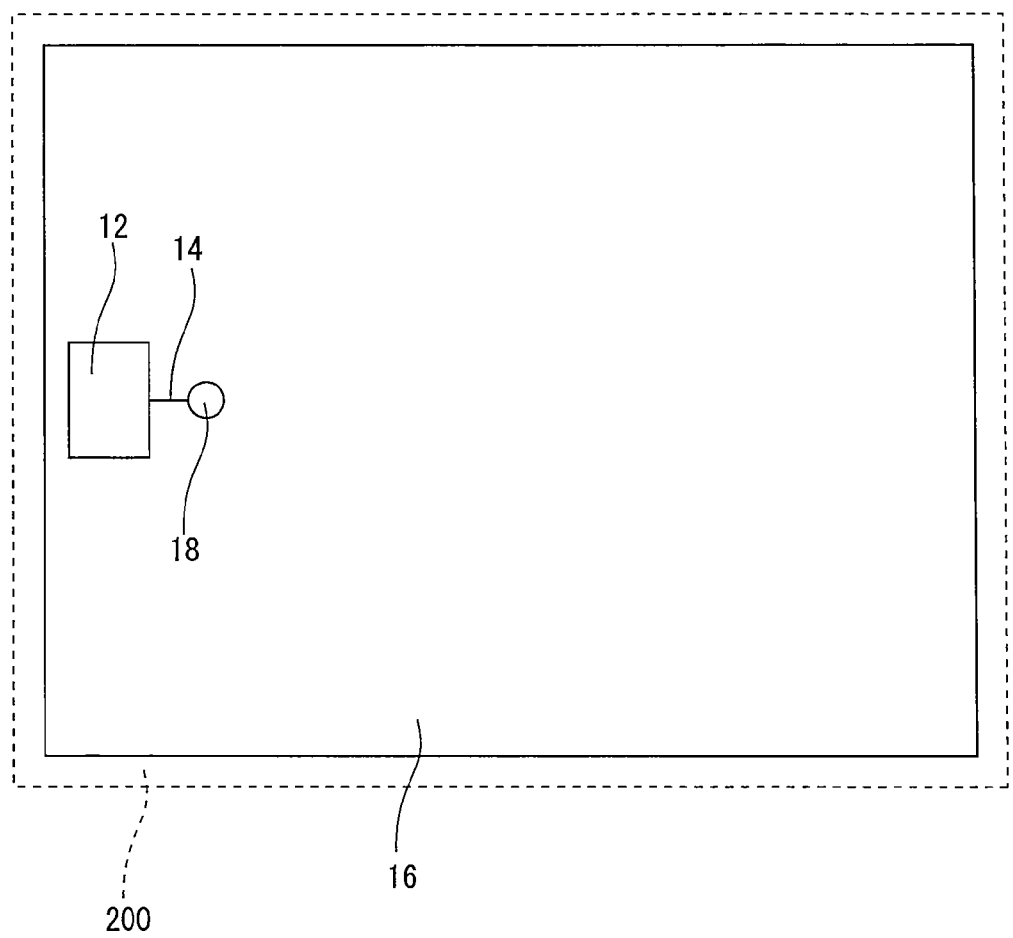
FIG. 43 is an illustrative diagram showing yet another example of the subirrigation system in accordance with this invention.
Figure 44:
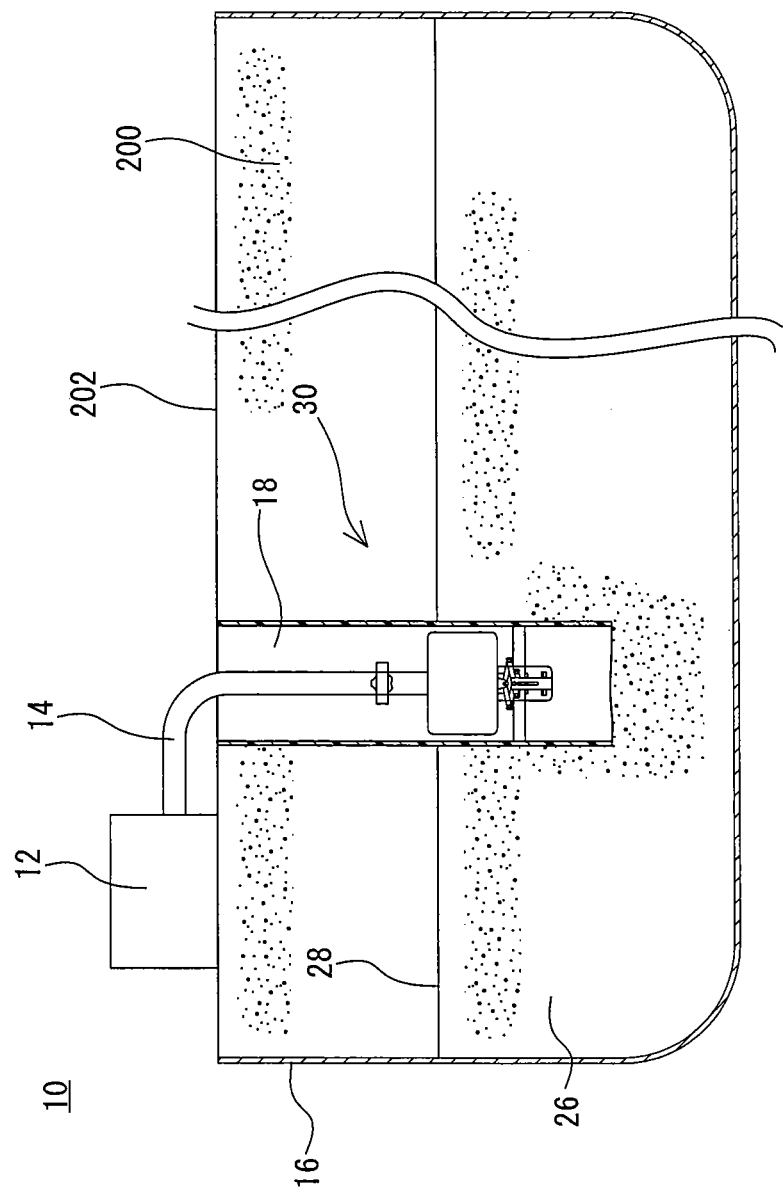
FIG. 44 is a schematic cross-sectional view showing the subirrigation system in FIG. 43.

In this case, as further the other embodiment, as shown in FIGS. 43 and 44, the water-impervious member 16 may be formed by utilizing a seepage control sheet formed by rubber, synthetic resin and the like.

Specifically, in the embodiment shown in FIGS. 43 and 44, the sheet-like water-impervious member 16 is paved down below the cultivated land 200 in such a manner as to expand to a whole surface of the cultivated land 200. An end portion of the sheet-like water-impervious member 16 is raised up, whereby the water-impervious member 16 is formed into an upper opening vessel shape. In this case, in the case that the periphery of the cultivated land 200 comes to an impermeable layer by an additional means, for example, clay or the like, and the case of using a seepage control sheet having a sufficient magnitude (width), it is sufficient that the sheet-like water-impervious member 16 is provided in a horizontal direction. Laid depth of the water-impervious member 16 in the horizontal direction, that is, a bottom surface of the water-impervious member 16 is, for example, between 300 and 500 mm.

It is possible to form the soil portion 26 in the gravitational water state there, even by feeding the water to the inner portion (or the upper side) of the water-impervious member 16 mentioned above, from the water tank 12 via the feed water pipe 14. Further, it is possible to properly form the soil portion 30 in the capillary water state by properly controlling the water level 28 of the gravitational water by the water level controller 18. Also in the embodiment shown in FIGS. 43 and 44, since the permeation function of the soil itself is utilized, a reduction of the permeation function is not generated by the clogging, and the operation and maintenance becomes easy. Further, since the water level control of the gravitational water is carried out in the feed water side, no waste water is fed, and it is possible to efficiently utilize the water resources.

In this case, the sheet-like water-impervious member 16 is not necessarily provided in a whole surface of the cultivated land 200, but may be formed in a partial range of the cultivated land 200, or may be arranged in a dispersing manner as in the embodiment shown in FIG. 1. In this case, since the seepage control sheet tends to be degraded in the case that the water-impervious member 16 is formed by the seepage control sheet, the water within the water-impervious member 16 leaks, and there is a possibility that it becomes hard to properly control the water content of the soil portion 30. Further, since the surplus water content due to the rainfall or the like cannot permeate deep in the ground in the case that the sheet-like water-impervious member 16 is provided in the whole surface of the cultivated land 200, it is necessary to additionally provide drainage equipment, and there is further a case that such a large tree that is rooted deep in the ground cannot be properly cultivated.

Further, in each of the embodiment mentioned above, the water tank 12 is structured so as to be connected to the agricultural water piping or the like so as to reserve the water delivered therefrom, however, is not limited to this. For example, in the case of a small-scaled system 10 used for personal use, the cultivator (the user) may appropriately replenish the water within the water tank 12 by using a bucket or the like. Further, for example, the rainwater may appropriately be reserved within the water tank 12. Further, it is not exactly necessary to provide the water tank 12, but the water may be fed directly to the feed water pipe 14 from the agricultural water piping or the like.

Further, the piping structure of the feed water pipe 14 is appropriately changed in correspondence to the arrangement of the water-impervious member 16, for example, the feed water pipe 14 may be formed only by the main pipe 20, and a third branch pipe branching from the second branch pipe 22b may be further formed.

Further, the water level controller 18 as shown in FIG. 3 is used, in the embodiment shown in FIG. 1, and the simplified water level controller 18 as shown in FIG. 8 is used, in the embodiment shown in FIG. 7, however, the structure is not limited to this. The water level controller 18 shown in FIG. 3 or 8 can be used in any embodiment, and the water level controller 18 having the other structure than the water level controller 18 shown in FIG. 3 or 8 may be applied to the system 10. In this case, since the force closing the feed water port 84 is weak in the simplified water level controller 18 shown in FIG. 8, in comparison with the water level controller 18 shown in FIG. 3, the simplified water level controller 18 shown in FIG. 8 can be used only in the case that the water fed from the feed water pipe 14 is the low pressure water.

Figure 45:
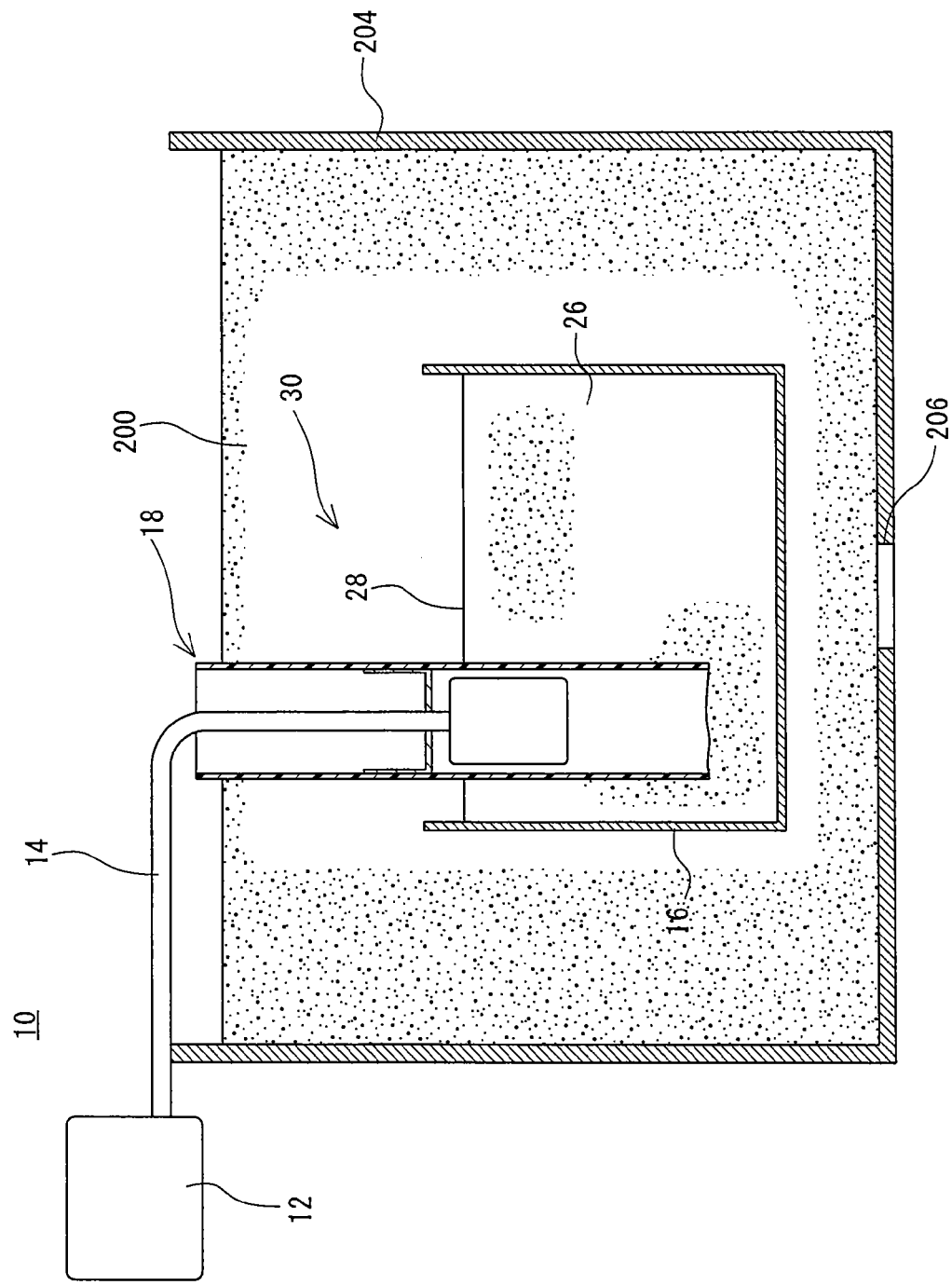
FIG. 45 is a schematic cross-sectional view showing yet another example of the subirrigation system in accordance with this invention.

In this case, since the simplified water level controller 18 shown in FIG. 8 can be simply and inexpensively manufactured, it is optimum by being used at a time of applying the system 10 to the small-scaled cultivated land 200. For example, as shown in FIG. 45, in the case that the system 10 is applied to a planter 204 arranged in the open air, one water-impervious member 16 may be buried in the cultivated land 200 within the planter 204 (that is, the soil within the planter 204), and one simplified water level controller 18 may be provided within the water-impervious member 16. The feed water pipe 14 connected to the water tank 12 is connected to the water level controller 18. Further, in the same manner as each of the embodiments mentioned above, if the soil portion 26 in the gravitational water state is formed within the water-impervious member 16, and the water level 28 of the gravitational water is kept properly, it is possible to form the soil portion 30 in the capillary water state in the upper layer portion of the soil within the planter 204, and it is possible to properly grow a plant such as flowering grasses. In this case, even if the surplus water is given into the planter 204 by the rainfall or the like, the water can come off from a hole 206 that is previously formed in a bottom surface of the planter 204. In other words, the same operation as the permeation of the surplus water deep into the ground in the embodiment shown in FIG. 1 can be achieved.

Further, in each of the embodiments mentioned above, the water-impervious member 16 is buried in the ground (in the soil), however, it is not exactly necessary that the water-impervious member 16 is buried in the ground. For example, as shown in FIG. 46, the planter 204 or a pot itself is utilized as the water-impervious member 16 so as to grow the flowering grasses or the like in the soil portion 30 in the capillary water state formed in the upper layer portion of the soil within the water-impervious member 16.

Specifically, it is preferable to apply the system 10 to the planter 204 or the like arranged inside of a house, and the planter 204 itself serves as the water-impervious member 16 in this case. In this case, it is necessary to seal the hole 206 formed in the bottom surface of the planter 204 by an appropriate sealing device 208 such as a cap, thereby structuring the planter 204 so as to have a water reserving function. One water level controller 18 is provided within the planter 204, that is, within the water-impervious member 16, and the soil portion 26 in the gravitational water state is formed within the water-impervious member 16 in the same manner as the embodiment shown in FIG. 45. In this case, it is preferable to keep the water level 28 of the gravitational water about middle of the soil within the water-impervious member 16, whereby the soil portion 30 in the capillary water state is formed in the upper layer portion of the soil within the water-impervious member 16. In this case, since the embodiment shown in FIG. 46 is applied to the planter 204 arranged inside of a house, it is not necessary to take into consideration a state that the water is excessively fed by the rainfall or the like.

Figure 46:
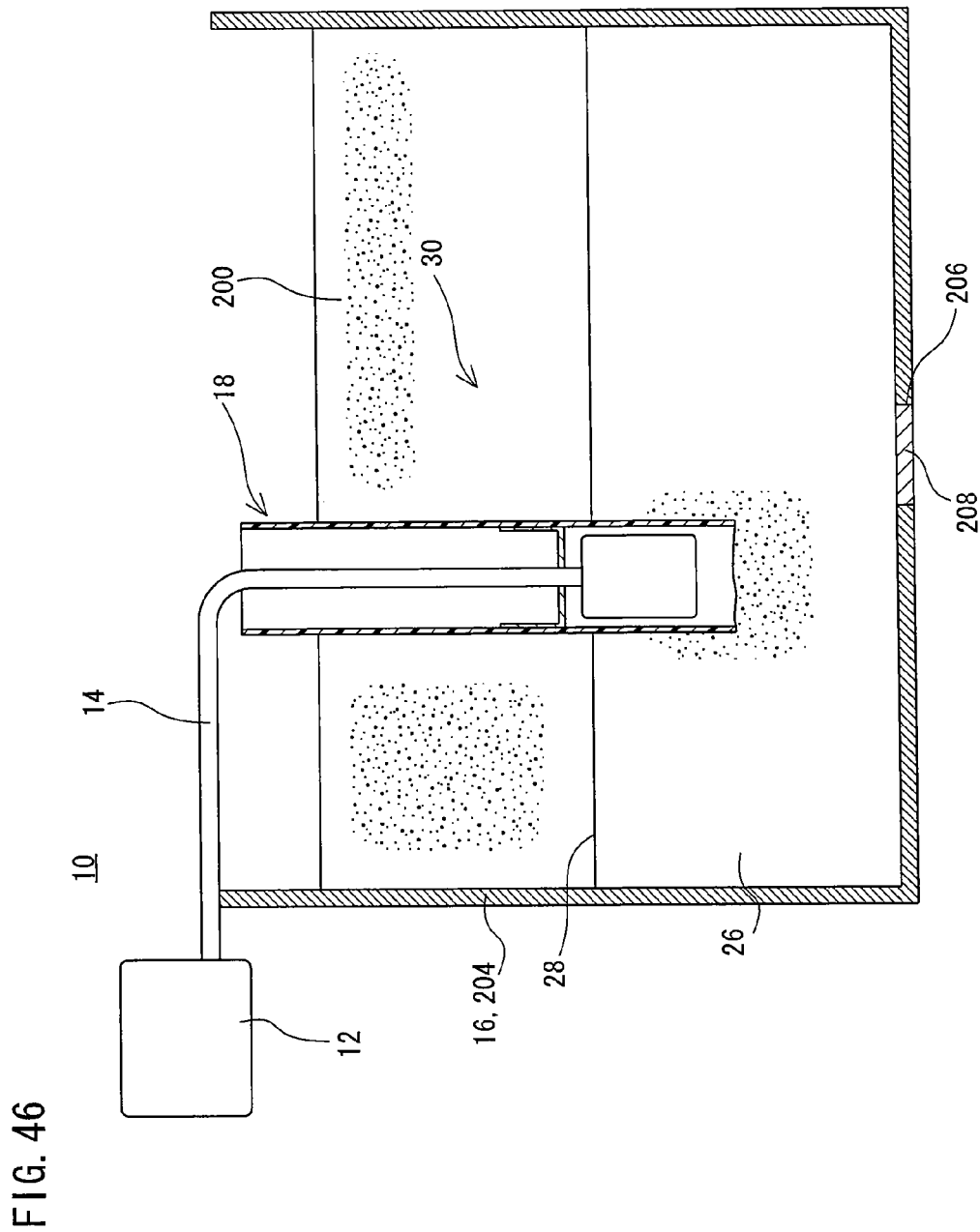
FIG. 46 is a schematic cross-sectional view showing yet another example of the subirrigation system in accordance with this invention.

Further, for example, in the case that the system 10 is applied to a roof greening, it is preferable to arrange the water-impervious member 16 having an appropriate magnitude on the roof, form the soil portion 30 in the capillary water state in the upper layer portion of the soil within the water-impervious member 16 in the same manner as the embodiment shown in FIG. 46, and grow the plant by the soil portion 30. In this case, in the case that it is applied to the outdoor, it is necessary to additionally provide appropriate drainage equipment.

Further, the system 10 can be constructed by combining the water-impervious members 16 shown in the embodiments. For example, it is possible to apply the water-impervious member 16 shown in FIG. 2, the water-impervious member 16 shown in FIG. 15, the water-impervious member 16 shown in FIG. 21, and the water-impervious member 16 shown in FIG. 37 within the same system. Further, for example, the soil portion 30 in the capillary water state having two layers can be formed by arranging the water-impervious member 16 shown in FIG. 2 on the sheet-like water-impervious member 16.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A subirrigation system, comprising:
   a water-impervious member formed in a vessel shape having an upper opening and a curved bottom surface, said water-impervious member being arranged horizontally and having a soil portion in an inner portion of said vessel shape;
   a water feeder which feeds water to the upper side of said water-impervious member to render the soil portion in a gravitational water state, said water feeder including a water source and a water feed pipe; and
   a water level controller which is disposed along said water feed pipe such that water is fed from said water source to said water level controller via said water feed pipe, and water is fed from the said water level controller to said water-impervious member,
   wherein said water level controller comprises:
      a vertical pipe which is opened to the atmosphere in an upper portion thereof,
      a feed water port which is provided inside said vertical pipe below said upper portion and feeds water into an inside of said vertical pipe through said water feed pipe, a water level in said vertical pipe being linked via said water feed pipe with a water level of said gravitational water in said soil portion, and
      a float which is provided inside said vertical pipe and moves in accordance with a change of the water level within said vertical pipe, said feed water port being closed in the inside of said vertical pipe by a movement of said float at a time that the water level of the vertical pipe is equal to or more than a set water level and opened in the inside of said vertical pipe by a movement of said float at a time that the water level of the vertical pipe is less than the set water level, whereby said water level of gravitational water in said soil portion can be controlled by said float.

2. A subirrigation system according to claim 1, wherein said water feeder includes a pipe member which is provided in the inner portion of said water-impervious member and forms a water channel passing through the inner portion of said water-impervious member, and wherein the subirrigation system further comprises a connection member provided at least in one end portion of said water-impervious member, said connection member connecting said water-impervious member and other said water-impervious member to render the water-impervious members continuous axially, said connection member also connecting said pipe member and other said pipe member to render said pipe member and other said pipe member continuous axially.

3. A subirrigation system according to claim 1, wherein said water-impervious member includes a rising portion rising upward from a peripheral edge of said opening, said rising portion being integrally formed with said water-impervious member and having a water-impervious property, thereby to prevent the water from escaping to the outside of the water-impervious member.

4. A subirrigation system according to claim 1, wherein said water-impervious member includes a reinforcing portion which reinforces an edge of said opening to maintain the vessel shape of said water-impervious member, said reinforcing portion being integrally formed with said water-impervious member.

5. A subirrigation system according to claim 1, wherein said water-impervious member further includes a collar-shaped member which prevents the water from escaping to the outside of the water-impervious member, said collar-shaped member having a water-impervious property.

6. A double-pipe unit used in a subirrigation system according to claim 1 and continuously provided in the ground of a cultivated land, comprising:
   a first pipe member arranged horizontally and having an upper opening, said first pipe member functioning as a water-impervious member;
   a second pipe member provided in an inner portion of said first pipe member; and
   a connection member provided at least one end portion of said first pipe member, and connecting said first pipe member and other said first pipe member to render the first pipe members continuous axially as well as connecting said second pipe member and other said second pipe member to render the second pipe members continuous axially.

7. A subirrigation system according to claim 1, wherein a height at which the feed water port is closed and opened corresponds to the water level of gravitational water.

8. A water level controller used in a subirrigation system which controls a feed water to an upper side of a water-impervious member having a soil portion in an inner portion thereof by a feed water pipe to render the soil portion in a gravitational water state in a subirrigation system, and which is disposed along said feed water pipe such that water is fed from a water source to said water level controller via said water feed pipe, and water is fed from said water level controller to said water-impervious member, comprising:
   a vertical pipe, which is opened to the atmosphere in an upper portion thereof,
   a feed water port which is provided inside said vertical pipe below said upper portion and feeds water into an inside of said vertical pipe through said water feed pipe, a water level in said vertical pipe being linked via said water feed pipe with a water level of said gravitational water in said soil portion; and a float which is provided inside said vertical pipe and moves in accordance with a change of the water level within said vertical pipe, said feed water port being closed in the inside of said vertical pipe by a movement of said float at a time that the water level of the vertical pipe is equal to or more than a set water level and opened in the inside of said vertical pipe by a movement of said float at a time that the water level of the vertical pipe is less than the set water level, whereby said water level of gravitational water in said soil portion can be controlled by said float.

9. A water level controller according to claim 8, wherein said float comes into contact with an end of said feed water pipe so as to close said feed water port at a time when the level within said vertical pipe is equal to or more than the set water level, and comes away from the end of said feed water pipe so as to open said feed water port at a time when the level within said vertical pipe is less than the set water level.

10. A water level controller according to claim 8,
wherein said vertical pipe is arranged in an inner portion of each water-impervious member,
wherein said float moves according to a change of the level of the gravitational water in said water-impervious member, and
wherein in accordance with a motion of said float, the water level controller closes the feed water port at a time when the level of the gravitational water within said water-impervious member is equal to or more than a set water level, and opens the feed water port at a time when the level of the gravitational water within said water-impervious member is less than the set water level.

11. A subirrigation system, comprising:
a water-impervious member having an upper opening and being arranged horizontally, said water-impervious member having a soil portion in an inner portion thereof;
a water feeder including a water source and a water feed pipe having a feed water port provided at least at a lower portion thereof, said water feeder feeding water through said feed water port to the upper side of said water-impervious member to render the soil portion in a gravitational water state; and
a water level controller which is disposed along said water feed pipe such that water is fed from said water source to said water level controller via said water feed pipe, and water is fed from the said water level controller to said water-impervious member,
wherein said water level controller comprises:
a vertical pipe which is opened to the atmosphere in an upper portion thereof,
a feed water port which is provided inside said vertical pipe below said upper portion and feeds water into an inside of said vertical pipe through said water feed pipe, a water level in said vertical pipe being linked via said water feed pipe with a water level of said gravitational water in said soil portion, and
a float which is provided inside said vertical pipe and moves in accordance with a change of the water level within said vertical pipe, said feed water port being closed in the inside of said vertical pipe by a movement of said float at a time that the water level of the vertical pipe is equal to or more than a set water level and opened in the inside of said vertical pipe by a movement of said float at a time that the water level of the vertical pipe is less than the set water level, whereby said water level of gravitational water in said soil portion can be controlled by said float.

12. A subirrigation system, comprising:
a water-impervious member formed in a cylinder shape having an upper opening in an upper end thereof and a connection port in a side surface lower portion thereof, said water-impervious member being arranged vertically and having a soil portion in an inner portion thereof;
a water feeder which feeds water to the upper side of said water-impervious member to render the soil portion in a gravitational water state, said water feeder including a water source and a water feed pipe;
a water-permeable member which is provided in the inner portion at a position higher than said connection port to hold said soil portion within said water-impervious member; and
a water level controller which is disposed along said water feed pipe such that water is fed from said water source to said water level controller via said water feed pipe, and water is fed from the said water level controller to said water-impervious member,
wherein said water level controller comprises:
a vertical pipe which is opened to the atmosphere in an upper portion thereof,
a feed water port which is provided inside said vertical pipe below said upper portion and feeds water into an inside of said vertical pipe through said water feed pipe, a water level in said vertical pipe being linked via said water feed pipe with a water level of said gravitational water in said soil portion, and
a float which is provided inside said vertical pipe and moves in accordance with a change of the water level within said vertical pipe, said feed water port being closed in the inside of said vertical pipe by a movement of said float at a time that the water level of the vertical pipe is equal to or more than a set water level and opened in the inside of said vertical pipe by a movement of said float at a time that the water level of the vertical pipe is less than the set water level, whereby said water level of gravitational water in said soil portion can be controlled by said float.

13. A subirrigation system, comprising:
a plurality of water-impervious members being arranged horizontally in a dispersing manner and each having an upper opening, each said water-impervious member having a soil portion in an inner portion thereof;
a water feeder which feeds water to the upper side of said water-impervious member to render the soil portion in a gravitational water state, said water feeder including a water source and a water feed pipe; and
a water level controller which is disposed along said water feed pipe such that water is fed from said water source to said water level controller via said water feed pipe, and water is fed from the said water level controller to said water-impervious member,
wherein said water level controller comprises:
a vertical pipe which is opened to the atmosphere in an upper portion thereof,
a feed water port which is provided inside said vertical pipe below said upper portion and feeds water into an inside of said vertical pipe through said water feed pipe, a water level in said vertical pipe being linked via said water feed pipe with a water level of said gravitational water in said soil portion, and
a float which is provided inside said vertical pipe and moves in accordance with a change of the water level within said vertical pipe, said feed water port being closed in the inside of said vertical pipe by a movement of said float at a time that the water level of the vertical pipe is equal to or more than a set water level and opened in the inside of said vertical pipe by a movement of said float at a time that the water level of the vertical pipe is less than the set water level, whereby said water level of gravitational water in said soil portion can be controlled by said float.

* * * * *